United States Patent
Basta et al.

(10) Patent No.: US 11,089,094 B2
(45) Date of Patent: Aug. 10, 2021

(54) COLLABORATOR NETWORK CREATION USING CLOUD-BASED METADATA

(71) Applicant: Box, Inc., Redwood City, CA (US)

(72) Inventors: Matthew A. Basta, Redwood City, CA (US); Christopher Ling, Los Altos, CA (US); Tarrence Van As, Los Altos, CA (US)

(73) Assignee: Box, Inc., Redwood City, CA (US)

(*) Notice: Subject to any disclaimer, the term of this patent is extended or adjusted under 35 U.S.C. 154(b) by 111 days.

(21) Appl. No.: 16/127,116

(22) Filed: Sep. 10, 2018

(65) Prior Publication Data

US 2019/0020712 A1    Jan. 17, 2019

Related U.S. Application Data

(63) Continuation of application No. 15/092,458, filed on Apr. 6, 2016, now Pat. No. 10,075,518.

(51) Int. Cl.
*H04L 29/08* (2006.01)
*H04L 29/06* (2006.01)

(52) U.S. Cl.
CPC ...... *H04L 67/1042* (2013.01); *H04L 65/1003* (2013.01); *H04L 65/403* (2013.01); *H04L 67/141* (2013.01)

(58) Field of Classification Search
CPC ............ H04L 65/1003; H04L 65/403; H04L 67/1042; H04L 67/141
See application file for complete search history.

(56) References Cited

U.S. PATENT DOCUMENTS

| 7,987,368 B2* | 7/2011 | Zhu ................... H04L 9/3236 |
| | | 713/175 |
| 9,648,652 B2* | 5/2017 | Granbery .......... H04W 84/12 |
| 10,348,818 B1* | 7/2019 | Bridges ............. H04W 4/023 |
| 2004/0133652 A1 | 7/2004 | Miloushev |

(Continued)

OTHER PUBLICATIONS

"Amazon DynamoDB", Wikipedia, Dec. 2015, URL:https://en.wikipedia.org/wiki/Amazon_DynamoDB, Accessed on Dec. 19, 2015.

(Continued)

*Primary Examiner* — Jason D Recek
(74) *Attorney, Agent, or Firm* — Vista IP Law Group, LLP

(57) ABSTRACT

Systems for managing user collaboration over objects stored on a cloud-based service platform. A server in a cloud-based platform maintains a set of read/write metadata that is associated in one-to-one correspondence to stored objects that are accessible by two or more collaborators. The server does not maintain a list of peers that communicate over peer-to-peer connections, rather the server exposes a semaphore for access to the metadata that pertains to a particular one of the stored objects. The server responds to download requests from the collaborators so as to deliver executable signaling protocol computer code to the collaborators' user devices. The signaling protocol code includes semaphore access by the collaborators' user devices using an application programming interface. Two or more accesses over the same semaphore establishes a leader and at least one follower. Corresponding ephemeral peer-to-peer connections are established between the leader and the at least one follower.

21 Claims, 16 Drawing Sheets

(56) References Cited

U.S. PATENT DOCUMENTS

| | | | | |
|---|---|---|---|---|
| 2012/0310882 | A1* | 12/2012 | Werner | H04L 67/1095 |
| | | | | 707/624 |
| 2013/0073688 | A1 | 3/2013 | Limbasia | |
| 2014/0172790 | A1 | 6/2014 | Pathak | |
| 2014/0280605 | A1 | 9/2014 | Zhang | |
| 2015/0180748 | A1 | 6/2015 | Ding | |
| 2016/0321291 | A1* | 11/2016 | Malhotra | G06F 16/188 |

OTHER PUBLICATIONS

"BigTable", Wikipedia, Nov. 2015, URL:https://en.wikipedia.org/wiki/BigTable, Accessed on Dec. 19, 2015.

"Box Developer: Metadata API Documentation—V2", URL:https://developers.box.com/metadata-api-v2/, 2015 Accessed on Dec. 19, 2015.

"Friends: P2P chat powered by the web", URL:http://moose-team.github.io/friends/, Accessed on Nov. 27, 2015.

"IEEE 802.11s", Wikipedia, URL:https://en.wikipedia.org/wiki/IEEE_802.11s, Nov. 2015, Accessed on Nov. 27, 2015.

"Name server", Wikipedia, URL:https://en.wikipedia.org/wiki/Name_server, Dec. 2015, Accessed on Dec. 19, 2015.

"Paxos (computer science)", Wikipedia, URL:https://en.wikipedia.org/wiki/Paxos_(computer_science), Mar. 2016, Accessed on Mar. 22, 2016.

"Raft (computer science)", Wikipedia, URL:https://en.wikipedia.org/wiki/Raft_(computer_science), Mar. 2016, Accessed on Dec. 17, 2015.

"Spanner (database)", Wikipedia, URL:https://en.wikipedia.org/wiki/Spanner_(database), Dec. 2015, Accessed on Dec. 19, 2015.

Notice of Allowance dated May 9, 2018 for U.S. Appl. No. 15/092,458.

Non-Final Office Action dated Jan. 9, 2018 for U.S. Appl. No. 15/092,458.

* cited by examiner

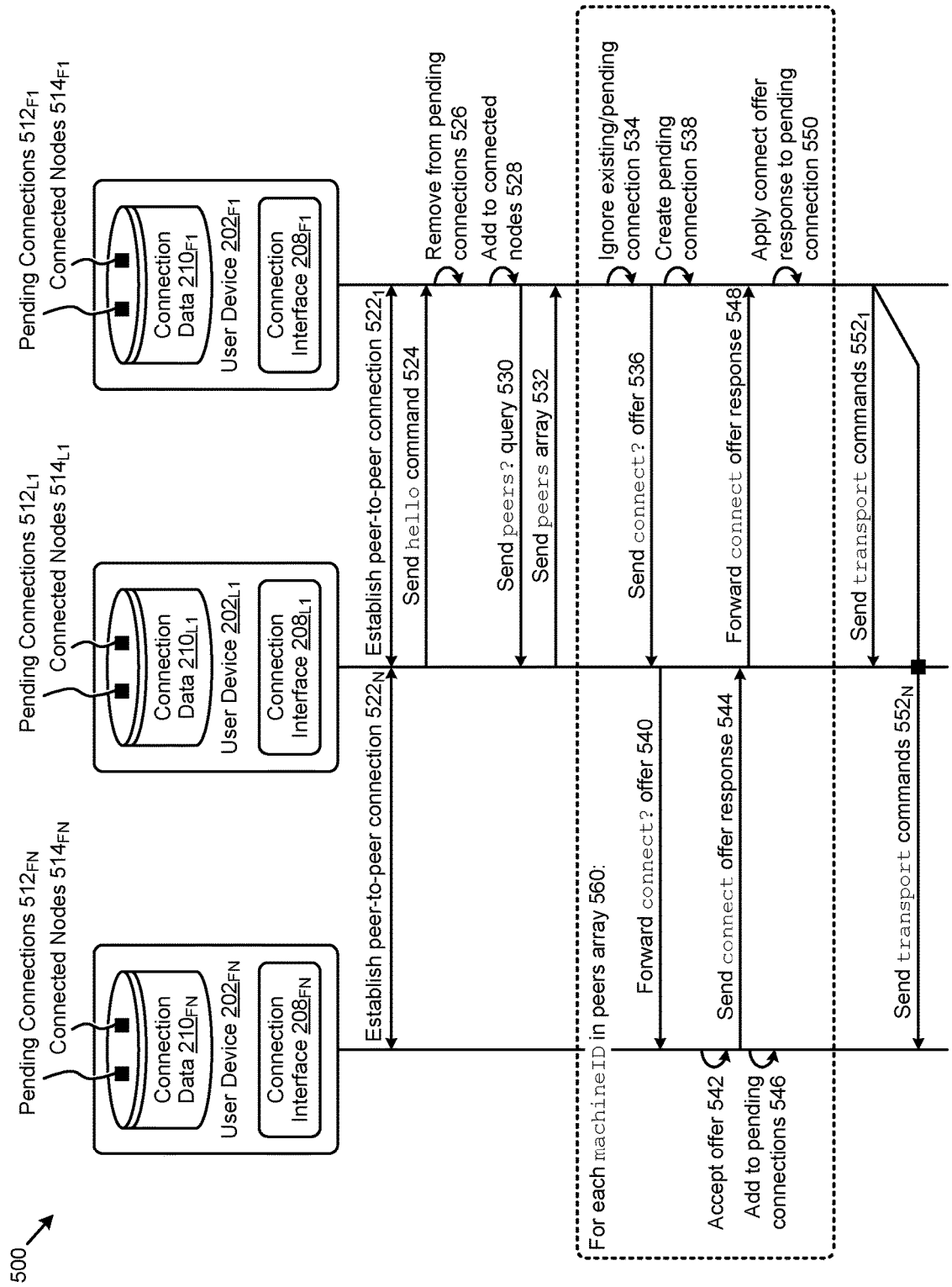

COLLABORATOR NETWORK CREATION USING CLOUD-BASED METADATA

CROSS REFERENCE TO RELATED APPLICATION(S)

This application is a continuation of U.S. application Ser. No. 15/092,458, filed on Apr. 6, 2016, entitled "Collaborator Network Creation Using Cloud-Based Metadata," which is hereby incorporated by reference in its entirety.

FIELD

This disclosure relates to managing user collaboration in a cloud-based service platform, and more particularly to techniques for creating peer-to-peer collaborator networks using a cloud-based semaphore.

BACKGROUND

Cloud-based content management services and platforms have influenced the way personal and corporate electronically stored information objects (e.g., files, images, videos, etc.) are stored, and has also impacted the way such personal and corporate content is shared and managed. One benefit of using such cloud-based systems is the ability to securely share content among trusted collaborators on a variety of user devices such as mobile phones, tablets, laptop computers, desktop computers, and/or other devices. Certain cloud-based platforms might further provide document creation applications for such user devices so as to allow the collaborators to create and/or edit documents within the cloud-based platform, thus facilitating real-time sharing. Other applications might also be provided to facilitate other types of peer-to-peer collaboration, such as collaboration activities pertaining to real-time over-the-Internet communications (e.g., on-line chatting), online gaming (e.g., massively multiplayer online gaming), etc. In such situations, the reliability and/or security of the networks accessible by the collaborator nodes (e.g., user devices) can vary wildly. For example, one collaborator node might be connected to an enterprise intranet protected by a firewall, while another collaborator node might be connected to an unreliable public Internet router serving wireless connections.

Unfortunately, legacy approaches to creating and/or managing the peer-to-peer collaborator connections and/or networks for the foregoing environments can be limited at least as pertaining to scalability, efficiency, and/or other factors. For example, such legacy approaches might designate one or more central servers to create and manage the connections among peers. These legacy approaches do not scale well. For example, geographically distributed systems will need to coordinate nodes that may be networked to various central servers across multiple data centers. This requires each central server to maintain a consensus of the nodes that are currently connected, the central servers associated with each node, and/or other connection attributes. Such legacy approaches further require each node to maintain a persistent open connection to the central server, which can precipitate problems with handling large volumes of collaborators and/or maintaining compliance with certain privacy and/or regulatory rules. Other legacy peer-to-peer connection approaches implementing short-range user device tethering (e.g., using Bluetooth, WiFi, etc.) are also deficient in the same and other ways.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for creating peer-to-peer collaborator networks using cloud-based metadata, which techniques advance the relevant technologies to address technological issues with legacy approaches. More specifically, the present disclosure provides a detailed description of techniques used in systems, methods, and in computer program products for creating peer-to-peer collaborator networks using cloud-based metadata. Certain embodiments are directed to technological solutions that facilitate signaling among collaborators using static, atomic key-value pairs to establish direct peer-to-peer connections between the collaborators over a public network, which embodiments advance the relevant technical fields as well as advancing peripheral technical fields. The disclosed embodiments modify and improve over legacy approaches. In particular, the herein-disclosed techniques provide technical solutions that address the technical problems attendant to efficiently creating many peer-to-peer collaborator connection networks among large volumes of collaborators in an unreliable networking environment. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Embodiments involve a server in a cloud-based platform that maintains a set of read/write metadata that is associated in one-to-one correspondence to stored objects that are accessible by two or more collaborators. The server does not maintain a list of peers and/or a list of peer-to-peer connections, rather the server exposes a semaphore for access to the metadata that pertains to a particular one of the stored objects. The server responds to download requests from the collaborators so as to deliver executable signaling protocol computer code to the collaborators' user devices. The signaling protocol code includes semaphore access by the collaborators' user devices using an application programming interface. Two or more accesses over the same semaphore establishes a leader and at least one follower. Corresponding ephemeral peer-to-peer connections are established between the leader and the at least one follower.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 5 presents a node-to-node communication protocol as implemented in systems for creating peer-to-peer collaborator networks using cloud-based metadata, according to an embodiment.

DETAILED DESCRIPTION

Figures 1A, 1B:
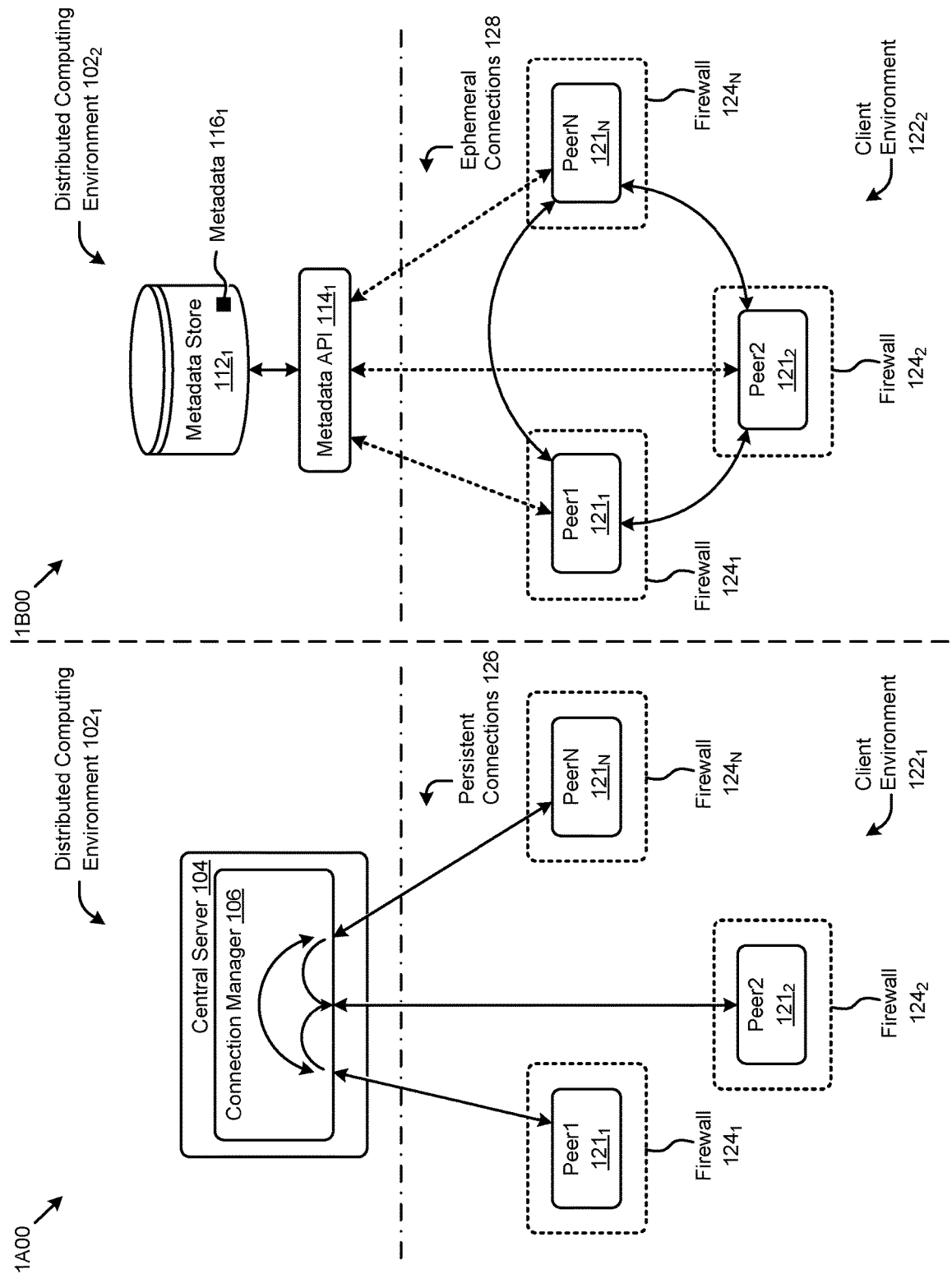
FIG. 1A depicts a centralized peer-to-peer connection technique.
FIG. 1B depicts a metadata signaling technique implemented in systems for creating peer-to-peer collaborator networks using cloud-based metadata, according to some embodiments.

Some embodiments of the present disclosure address the problem of efficiently creating many peer-to-peer collaborator connection networks among large volumes of collaborators in an unreliable networking environment and some embodiments are directed to approaches that facilitate signaling among collaborators using static, atomic key-value pairs to establish direct peer-to-peer connections between the collaborators over a public network. More particularly, disclosed herein and in the accompanying figures are exemplary environments, systems, methods, and computer program products for creating peer-to-peer collaborator networks using cloud-based metadata.

Overview

Disclosed herein are techniques that facilitate signaling among collaborators using static, atomic key-value pairs to establish direct peer-to-peer connections between the collaborators over a public network. The key-value pairs are stored in a cloud-based metastore that the collaborators are authorized to access through an application programming interface (API). The collaborators execute certain signaling protocols to create connections (e.g., WebRTC connections, etc.) directly among the user devices operated by the collaborators. In some embodiments, leader roles and/or follower roles for the collaborators can be established to facilitate efficient expansion and/or maintenance of the self-organizing networks. In some embodiments, a connection state machine, a connection interface, and/or a connection data store can be implemented on the collaborator user devices to enable such techniques disclosed herein.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a centralized peer-to-peer connection technique 1A00. The centralized peer-to-peer connection technique 1A00 shown in FIG. 1A uses a connection manager 106 at a central server 104 in a distributed computing environment $102_1$ (e.g., collaborative cloud-based content management environment) to create and maintain connections among various peers (e.g., peer1 $121_1$, peer2 $121_2$, peerN $121_N$) in a client environment $122_1$. In the centralized peer-to-peer connection technique 1A00, a connection from one peer to another peer traverses through the connection manager 106 at the central server 104. In some cases, the connections through the central server 104 can facilitate communication through one or more firewalls (e.g., firewall $124_1$, firewall $124_2$, . . . , and firewall $124_N$) associated with the peers. Specifically, the central server 104 can coordinate the creation of connections between each peer (e.g., by queuing connections, bridging connections, etc.). For example, when peer1 $121_1$ wants to establish a connection with other peers (e.g., peer2 $121_2$ and/or peerN $121_N$, etc.), the central server 104 fetches connection offer information from peer2 $121_2$ and/or peerN $121_N$ to forward to peer1 $121_1$. The central server 104 can also forward certain offer responses from peer1 $121_1$ to the other peers.

In many cases, scaling the centralized peer-to-peer connection technique 1A00 can be limited. For example, each instance of the central server 104 might need to coordinate connections associated with peers networked to various geographically distributed central servers across multiple data centers in the distributed computing environment $102_1$. In such cases, the connection manager 106 at each instance of the central server 104 would need to maintain a consensus of the peers that are currently connected, as well as to maintain an accounting of the central server associated with each peer, and would need to maintain other connection attributes as well. The centralized peer-to-peer connection technique manages, or attempts to manage, persistent connections 126 between each peer and the central server 104. For example, techniques for maintaining (e.g., re-establishing broken connections) the persistent connections 126 might be implemented to establish peer-to-peer connections in networking environments having varying reliability and/or security characteristics. The persistent connections 126 associated with the centralized peer-to-peer connection technique 1A00 introduces problems when handling large volumes of peers (e.g., collaborators) and/or when maintaining or attempting to maintain compliance with certain privacy and/or regulatory rules. Many of the deficiencies of the foregoing centralized peer-to-peer connection technique 1A00 are addressed by the herein disclosed techniques as described in FIG. 1B.

FIG. 1B depicts a metadata signaling technique 1B00 implemented in systems for creating peer-to-peer collaborator networks using cloud-based metadata. As an option, one or more variations of metadata signaling technique 1B00 or any aspect thereof may be implemented in the context of the architecture and functionality of the embodiments described herein. The metadata signaling technique 1B00 or any aspect thereof may be implemented in any environment.

The metadata signaling technique 1B00 illustrates one embodiment and resulting effect of the implementation of the herein disclosed techniques for creating peer-to-peer collaborator networks using cloud-based metadata. Specifically, the metadata signaling technique 1B00 depicts a set of peers (e.g., peer1 $121_1$, peer2 $121_2$, peerN $121_N$) in a client environment $122_2$ that desire to form a collaborator network. The purposes of the collaborator network can vary. For example, the collaborator network might be formed for content sharing and/or creation, real-time communication (e.g., on-line chatting), online gaming (e.g., massively multiplayer online gaming), etc. In some cases, the collaborator network can be a predetermined network or a planned network. In other cases, the collaborator network can be an ad hoc and/or self-organizing network. According to the metadata signaling technique 1B00 and/or other herein disclosed techniques, such collaborator networks can be formed using a set of metadata $116_1$ in a metadata store $112_1$. In some embodiments, the metadata store $112_1$ can be included in a distributed computing environment $102_2$ for access using a metadata API $114_1$.

Specifically, the metadata signaling technique 1B00 can facilitate forming various collaborator networks by using the metadata to store compare and swap values (e.g., using atomic key-value pairs, or using semaphores, etc.) to establish direct peer-to-peer connections between the peers while avoiding race conditions. In this technique, the peers manage the signaling for establishing the connections. Further, for example, the metadata $116_1$ can be based on any suitable atomic variable (e.g., key-value pair) technology, such as Box Content Metadata, Amazon Dynamo, Google BigTable/Spanner, and/or other technologies. In some embodiments, the metadata access for the peers can be authenticated by the metadata API $114_1$. The peers can execute certain signaling protocols comprising metadata access, metadata modifications, and/or other metadata operations to create connections directly (e.g., without traversing a central server) among the user devices operated by the peers (e.g., nodes). For example, such direct peer-to-peer connections might implement a web real-time communication (WebRTC) framework so as to traverse the firewalls (e.g., firewall $124_1$, firewall $124_2$, firewall $124_N$) of the peers. In other embodiments, leader roles and/or follower roles for the peers can be established (e.g., stored in the metadata $116_1$) to facilitate efficient expansion and/or maintenance of the collaborator networks.

Certain technological improvements can be facilitated by the herein disclosed techniques. For example, the metadata signaling technique 1B00 can be efficiently scaled due to the computing resources in the distributed computing environment $102_2$ merely managing the metadata API $114_1$ (e.g., as compared to managing the plurality of persistent connections 126 in the centralized peer-to-peer connection technique 1A00 in FIG. 1A). Efficient scaling is further enabled by the computing resources merely managing a limited set of ephemeral connections 128 at a given moment in time. For example, the ephemeral connections 128 at a certain moment in time might comprise a server connection from a peer connected to a collaborator network and various other connections from peers desiring to join the collaborator network. The high order steps and/or flow for forming such collaborator networks according to the herein disclosed techniques are illustrated in FIG. 1C.

Figure 1C:
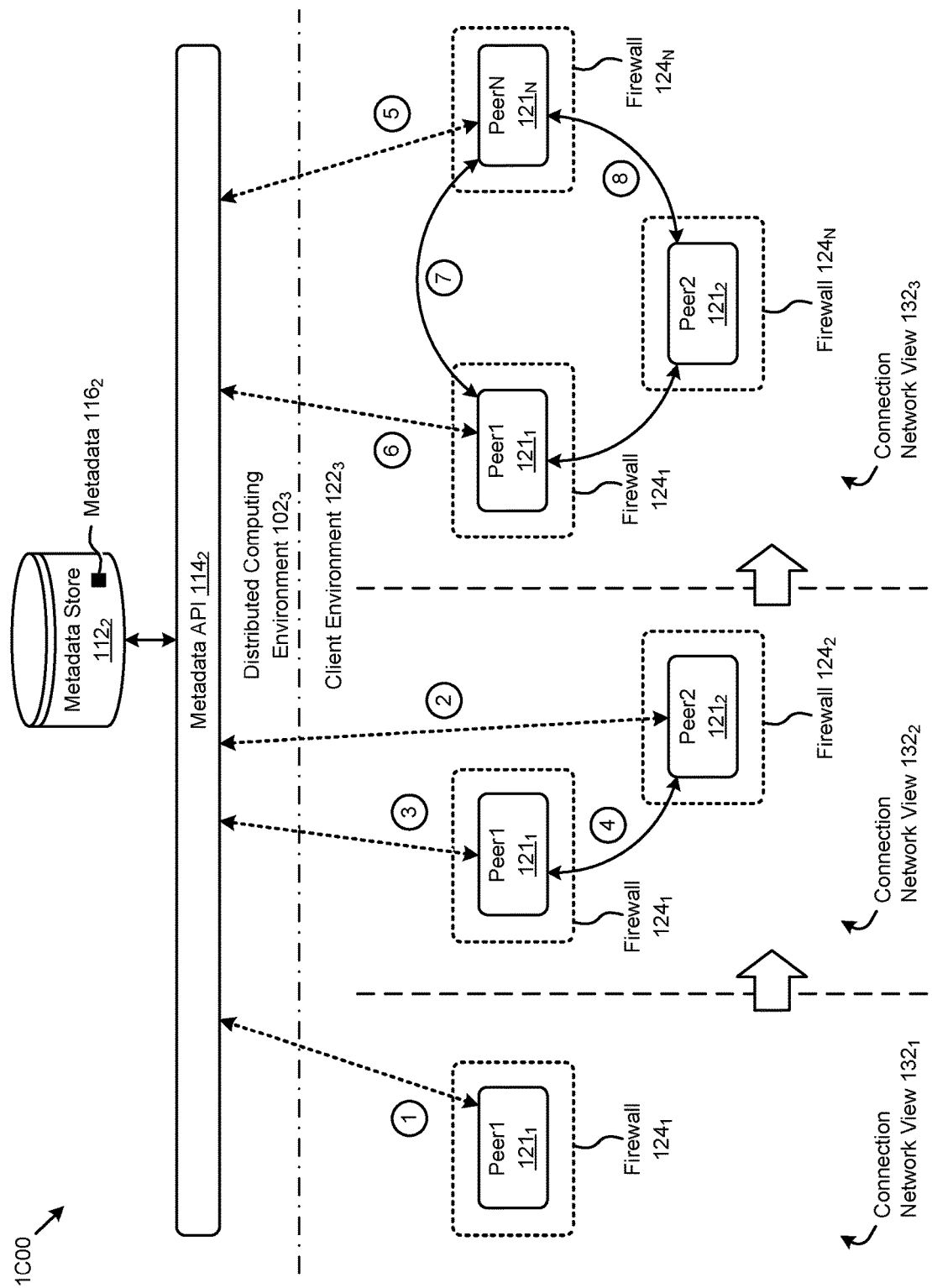
FIG. 1C illustrates a connection network creation technique as facilitated by systems for creating peer-to-peer collaborator networks using cloud-based metadata, according to some embodiments.

FIG. 1C illustrates a connection network creation technique 1C00 as facilitated by systems for creating peer-to-peer collaborator networks using cloud-based metadata. As an option, one or more variations of connection network creation technique 1C00 or any aspect thereof may be implemented in the context of the architecture and functionality of the embodiments described herein. The connection network creation technique 1C00 or any aspect thereof may be implemented in any environment.

As shown in FIG. 1C, the connection network creation technique 1C00 depicts three representative views (e.g., connection network view $132_1$, connection network view $132_2$, and connection network view $132_3$) of a certain connection network over the course of the creation of the connection network. Specifically, the connection network is formed among multiple peers (e.g., peer1 $121_1$, peer2 $121_2$, peerN $121_N$) in a client environment $122_3$ using a set of metadata $116_2$ in a distributed computing environment $102_3$ to enable the signaling for establishing the various connections comprising the connection network. In some cases, and as shown, the metadata $116_2$ can be stored in a metadata store $112_2$ for access by the peers through a metadata API $114_2$.

More specifically, in the connection network view $132_1$, peer1 $121_1$ can access the metadata $116_2$ to invoke the creation of the connection network (see step 1). For example, peer1 $121_1$ might want to collaborate on a certain content object, and start polling the metadata $116_1$ for other interested collaborators. In such cases, peer1 $121_1$ might be assigned a "leader" role in the connection network. As shown in connection network view $132_2$, peer2 $121_2$ might access the metadata $116_2$ to indicate (e.g., issue an offer) an interest in joining the connection network (see step 2). Peer1 $121_1$ can detect the offer from peer2 $121_2$ (see step 3) and respond such that a peer-to-peer connection between peer1 $121_1$ and peer2 $121_2$ can be established (see step 4). In some cases, peer2 $121_2$ might be assigned a "follower" role in the connection network. When the peer-to-peer connection is established, the connection from peer2 $121_2$ to the metadata API $114_2$ can be discarded, as shown in the connection network view $132_3$.

As further shown this view, peerN $121_N$ might also access the metadata $116_2$ to indicate an interest in joining the connection network (see step 5). Peer1 $121_1$ can detect the offer from peerN $121_N$ (see step 6) and respond such that a peer-to-peer connection between peer1 $121_1$ and peerN $121_N$ can be established (see step 7). In some cases, peerN $121_N$ might be assigned a "follower" role in the connection network. PeerN $121_N$ can further communicate with the leader of the connection network (e.g., peer1 $121_1$) to discover other peers (e.g., peer2 $121_2$) in the connection network available for connection. Specifically, for example, peerN $121_N$ can exchange connection offers and responses with peer2 $121_2$ and/or any other peers, if connected, via peer1 $121_1$ to establish a connection with peer2 $121_2$ (see step 8). The foregoing process can repeat until a complete connection graph comprising the connection network (e.g., collaborator network) is established.

Figure 1D:
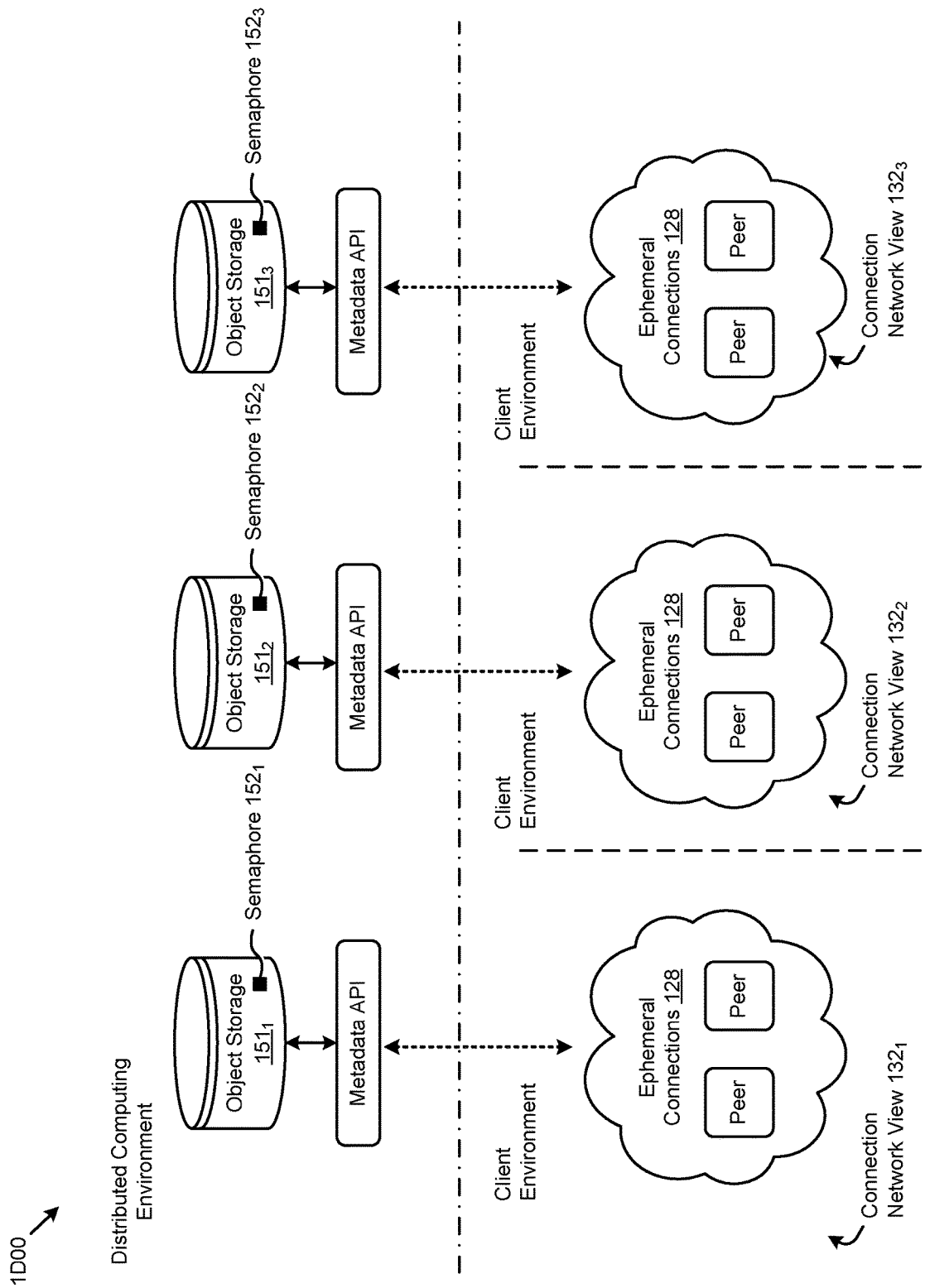
FIG. 1D illustrates a connection network creation technique as facilitated by a one-to-one relationship between an ephemeral network and respective cloud-based objects, according to some embodiments.
Figure 2:
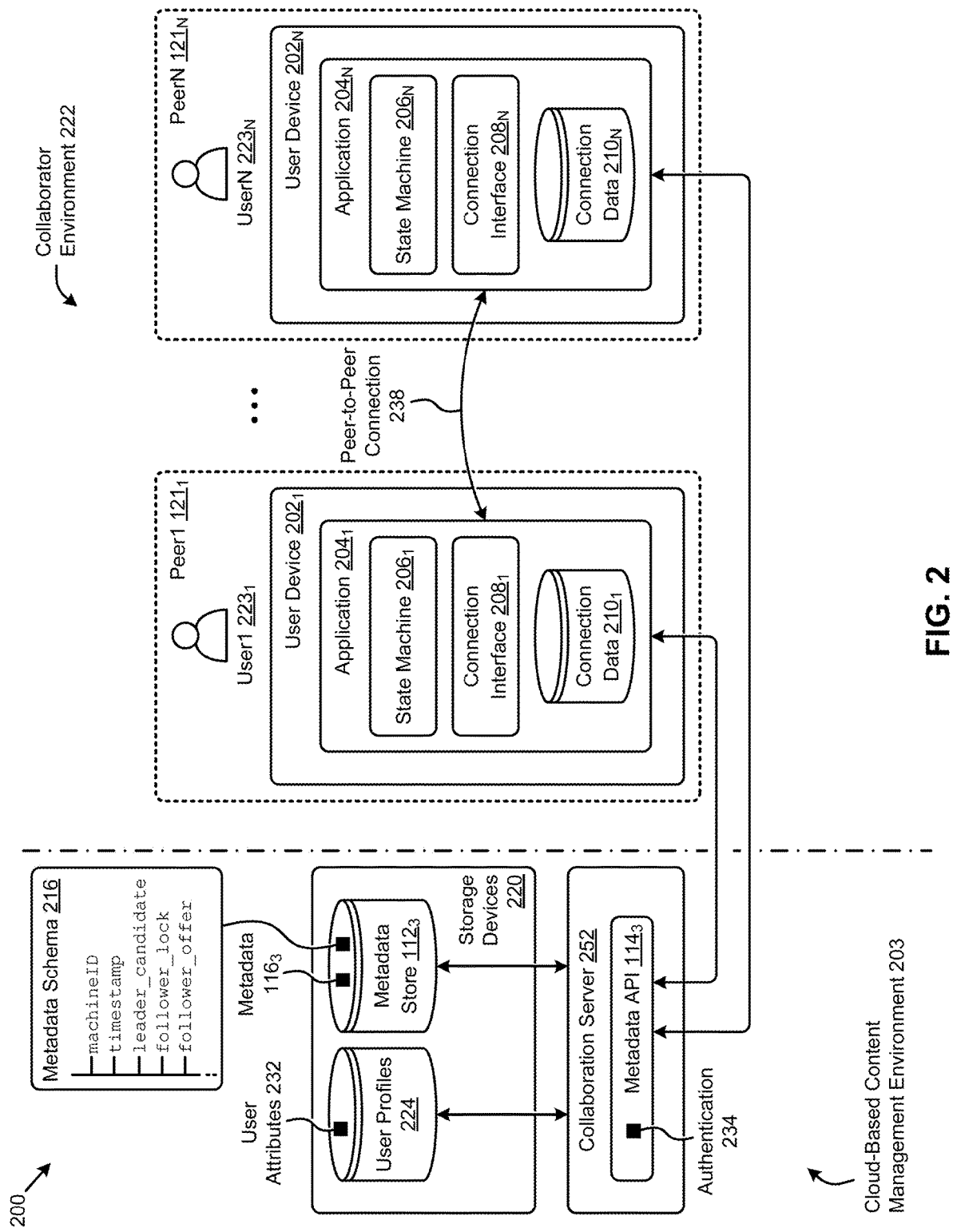
FIG. 2 is a schematic of a system to implement techniques for creating peer-to-peer collaborator networks using cloud-based metadata, according to some embodiments.

One embodiment of a system and/or data flows for implementing the herein disclosed techniques are shown and discussed as pertains to FIG. 1D and FIG. 2.

FIG. 1D illustrates a connection network creation technique 1D00 as facilitated by a one-to-one relationship between an ephemeral network and respective cloud-based objects.

As shown, a distributed computing environment comprises a plurality of objects stored in one or more instances of object storage (e.g., object storage $151_1$, object storage $151_2$, and object storage $151_3$). Each instance of a stored object (e.g., object storage $151_1$, object storage $151_2$, and object storage $151_3$) has a respective set of metadata that in turn comprises respective semaphores (e.g., semaphore $152_1$, semaphore $152_2$, and semaphore $152_3$). A particular semaphore is accessible by a peer through metadata API calls. Multiple peers can create multiple ephemeral connections 128 by accessing the semaphore associated with the stored object being accessed. As such, a new ephemeral peer-to-peer network using new ephemeral connections can be formed for each stored object.

FIG. 2 is a schematic of a system 200 to implement techniques for creating peer-to-peer collaborator networks using cloud-based metadata. As an option, one or more variations of system 200 or any aspect thereof may be implemented in the context of the architecture and functionality of the embodiments described herein. The system 200 or any aspect thereof may be implemented in any environment.

The system 200 depicts multiple peers (e.g., peer1 $121_1$, peerN $121_N$) in a collaborator environment 222 using various components in a cloud-based content management environment 203 to establish certain peer-to-peer connections (e.g., peer-to-peer connection 238) according to the herein disclosed techniques. Specifically, peer1 $121_1$ can represent a user1 $223_1$ operating a user device $202_1$ (e.g., laptop computer, smart phone, etc.). Also, peerN $121_N$ can represent a userN $223_N$ operating a user device $202_N$. In some cases, such peers can also be referred as nodes. In one or more embodiments, an instance of an application (e.g., application $204_1$, application $204_N$) might run on the user devices. For example, the application might be a browser-based web application.

As shown, the application might communicate with a metadata API $114_3$ operating on a collaboration server 252 in the cloud-based content management environment 203. Specifically, the metadata API $114_3$ might facilitate access by the peers (e.g., via applications running on user devices) to a set of metadata $116_3$ stored in a metadata store $112_3$. As shown, the metadata store $112_3$ can be included in a set of storage devices 220 accessible by the collaboration server 252. In one or more embodiments, the metadata $116_3$ can comprise atomic key-value pairs to be fetched and/or modified by the peers as part of a signaling protocol. For example, a metadata schema 216 might indicate the key-value pairs can be associated with a set of leader_candidate attributes, a set of follower_lock attributes, a set of follower_offer attributes, and/or other attributes to facilitate signaling among the peers. For example, the leader_candidate attributes can describe a peer that is a candidate for the leader of a collaborator network which can be accepted by a follower. The key-value pairs associated with the leader-candidate attributes might comprise machineID: 'machine id' or offer: 'leader local offer'. The follower_lock attributes can describe a virtual lock (e.g., quasi-lock) that enables one peer to accept the leader candidate at any moment in time. The key-value pairs associated with the follower_lock attributes might comprise timestamp: T123 or machineID: 'machine id'. The follower_offer attributes can describe an offer acceptance provided by a peer.

In some embodiments, one or more operations comprising an authentication 234 of the peers for accessing the metadata $116_3$ can be performed by the metadata API $114_3$ and/or other computing resources in the cloud-based content management environment 203. In some cases, the authentication 234 can be based on a set of user attributes 232 stored in a set of user profiles 224 accessible by the collaboration server 252. For example, the instances of the user attributes 232 associated with peer1 $121_1$ might indicate that peer1 $121_1$ can collaborate with, or form an ad hoc connection network with, peerN $121_N$. More specifically, the user attributes 232 might indicate peer1 $121_1$ and peerN $121_N$ are associated with a common enterprise, or are associated with one or more shared content objects, or are registered to play a common online game, or are associated by some other relationship. Such associations can serve to invoke the creation of the peer-to-peer collaborator networks according to the herein disclosed techniques. For example, user1 $223_1$ might use the application $204_1$ on user device $202_1$ to create a single peer network to share a certain content object (e.g., document A). Given the user attributes associated with userN $223_N$ to allow collaboration on document A, userN $223_N$ can use the application $204_N$ on user device $202_N$ to join the network that includes user1 $223_1$.

In some cases, the application might comprise various components to facilitate establishing the peer-to-peer connections according to the herein disclosed techniques. For example, the application might include a state machine (e.g., state machine $206_1$, . . . , state machine $206_N$) to manage the various states associated with the signaling protocol and/or the peer-to-peer connections. A connection interface (e.g., connection interface $208_1$, . . . , connection interface $208_N$) can also be implemented to manage the peer-to-peer communications (e.g., using a WebRTC framework). Various instances of connection data (e.g., connection data $210_1$, . . . , connection data $210_N$) can further be used to facilitate certain node-to-node communications and/or other operations at the user devices. In some cases, such application components can execute various routines associated with accessing the metadata $116_3$ for signaling purposes. Strictly as examples, an is_my_lock routine can return a result indicating whether the machineID associated with the follower_lock that matches the local user device machineID. As another example, an is_valid_follower_lock routine can return whether follower_lock is not null, is more than 30 seconds old, and is not is_my_lock. Also, for example, a fetch_metadata routine can fetch an instance of the metadata into local memory as an instance of last_meta. Certain global variables, such as last_known_leader can also be provided.

The system 200 of FIG. 2 presents merely one partitioning. The specific example shown is purely exemplary, and other partitioning is reasonable. One embodiment of an environment and protocol supporting such systems, subsystems, and/or partitionings for creating peer-to-peer collaborator networks using cloud-based metadata is shown in FIG. 3.

Figure 3:
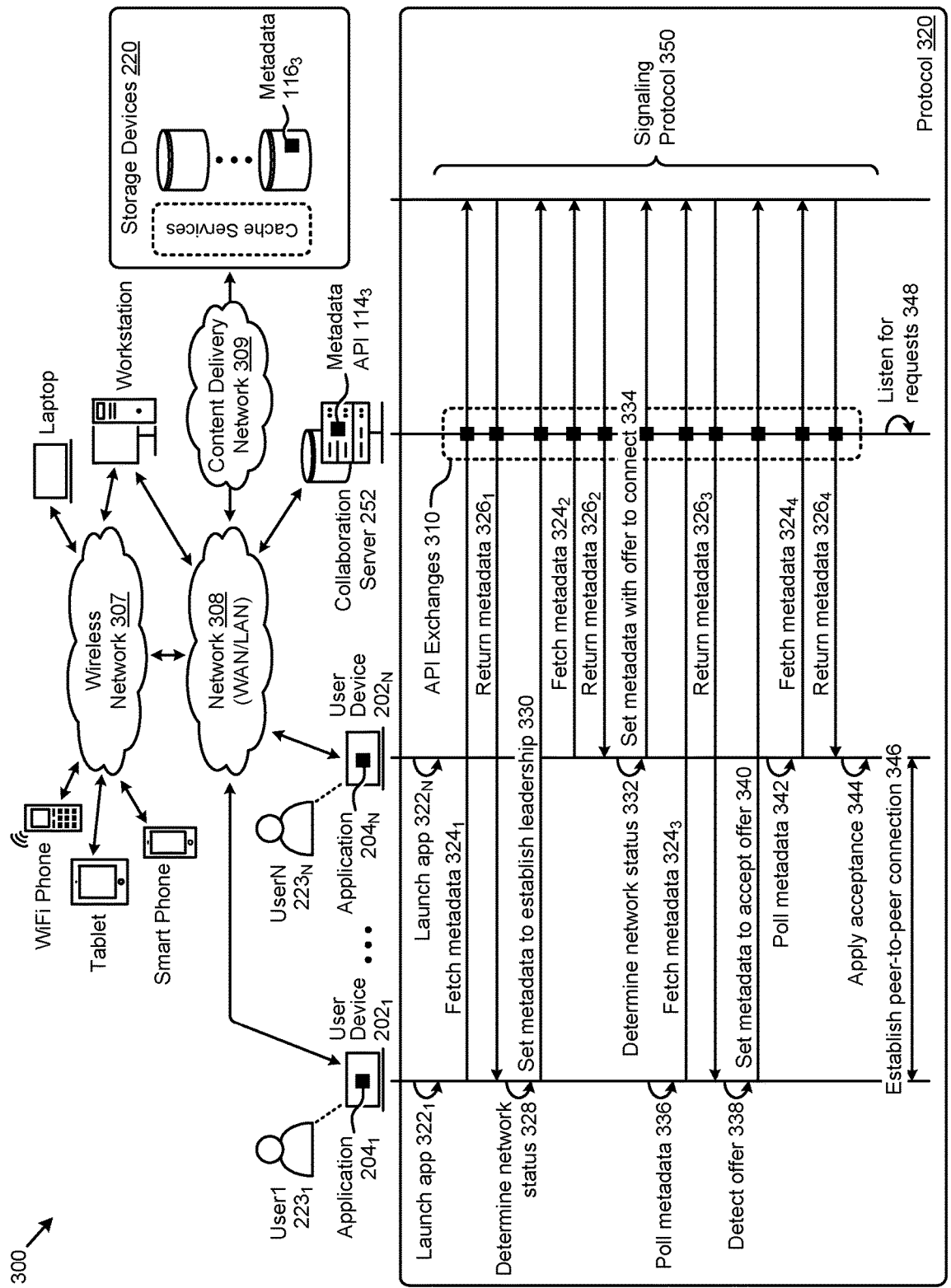
FIG. 3 is an environment that supports protocol exchanges to create peer-to-peer collaborator networks using cloud-based metadata, according to some embodiments.

FIG. 3 is an environment 300 that supports protocol exchanges to create peer-to-peer collaborator networks using cloud-based metadata. As an option, one or more variations of environment 300 or any aspect thereof may be implemented in the context of the architecture and functionality of the embodiments described herein. The environment 300 or any aspect thereof may be implemented in any environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such means for facilitating communications between computing system components. The wireless network 307, the network 308, and the content delivery network 309 can also collectively be referred to as the Internet. The content delivery network 309 can comprise any combination of a public network and a private network. More specifically, environment 300 can comprise at least one instance of the collaboration server 252 and the at least one instance of the storage devices 220. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 252 and the storage devices 220 can comprise a cloud-based content management platform that provides shared content management and storage services.

The environment 300 further comprises instances of user devices (e.g., user device $202_1$, . . . , user device $202_N$) that can represent one of a variety of other computing devices (e.g., a smart phone, a tablet, a WiFi phone, a laptop, a workstation, etc.) having software (e.g., application $204_1$, . . . , application $204_N$, respectively) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and the content delivery network 309. As shown, the user device $202_1$ can be operated by the user1 $223_1$ and the user device $202_N$ can be operated by the userN $223_N$. Also, according to the herein disclosed techniques, an instance of the metadata API $114_3$ can operate on the collaboration server 252 to, in part, enable the user devices to access the metadata $116_3$ stored in one or more storage facilities in the storage devices 220.

As shown, the user device $202_1$, the user device $202_N$, the collaboration server 252, and the storage devices 220 can exhibit a set of high order interactions (e.g., operations, messages, etc.) in a protocol 320. Specifically, and as shown, the application $204_1$ can be launched at the user device $202_1$ (see operation $322_1$) and the application $204_N$ can be launched at the user device $202_N$ (see operation $322_N$). Such applications, for example, might be instances of a web application provided by the cloud-based content management platform to facilitate use of the herein disclosed techniques. For example, user1 $223_1$ might use the application $204_1$ to access the metadata $116_3$ to create and/or join one or more collaborator networks.

As highlighted in the protocol 320, a set of messages and operations can be used in a signaling protocol 350 for creating peer-to-peer collaborator networks using cloud-based metadata. Specifically, such a grouping of interactions might commence with the user1 $223_1$ using the application $204_1$ to fetch a certain portion of the metadata $116_3$ to invoke the signaling protocol to create and/or join a collaborator network (see message $324_1$). The request for metadata can be received from the user device $202_1$ by the metadata API $114_3$ at the collaboration server 252 to access the metadata $116_3$ using an instance of a set of API exchanges 310 as depicted in FIG. 3. In some embodiments, the API exchanges 310 can be enabled, in part, by authentication and/or authorization of the user and/or user device by the metadata API $114_3$. The fetched metadata can be returned to the user device $202_1$ by the metadata API $114_3$ (see message $326_1$). The application $204_1$ at the user device $202_1$ can analyze the fetched metadata to determine the status of the subject network (see operation 328). For example, user1 $223_1$ might be the first to start a collaborator network associated with a given content object such that the status would indicate the subject network is a new network to be created. In this case, for example, the user1 $223_1$ can set the metadata $116_3$ to establish user1 $223_1$ as the leader of the collaborator network (see message 330).

The userN $223_N$ might use the application $204_N$ at the user device $202_N$ to invoke a request to fetch a portion of the metadata $116_3$ to discover one or more collaborator networks available to join (see message $324_2$). The fetched metadata can be returned to the user device $202_N$ by the metadata API $114_3$ (see message $326_2$). The application $204_N$ at the user device $202_N$ can analyze the fetched metadata to determine the status of collaborator networks available to userN $223_N$ (see operation 332). For example, userN $223_N$ and user1 $223_1$ might share a common group and/or enterprise such that the collaborator network earlier created by user1 $223_1$ is presented to userN $223_N$. In this case, userN $223_N$ can set the metadata with an offer to connect to the collaborator network created by user1 $223_1$ (see message 334). In the course of polling the metadata (see operation 336), user1 $223_1$ might issue various requests to fetch metadata (see message $324_3$) and receive various instances of returned metadata (see message $326_3$). Among the sets of fetched metadata, the application $204_1$ at user device $202_1$ might detect the offer to connect to the collaborator network from userN $223_N$ (see operation 338). In response, user1 $223_1$ can then set the metadata to accept the offer (see message 340). Furthermore, in the course of userN $223_N$ polling the metadata (see operation 342), userN $223_N$ might also issue various requests to fetch the metadata (see message $324_4$) and receive various instances of returned metadata (see message $326_4$). Among the sets of fetched metadata, the application $204_N$ at user device $202_N$ might detect and/or apply the accept to connect with user1 $223_1$ (see operation 344). When the offer acceptance has been applied, a peer-to-peer connection between user1 $223_1$ and userN $223_N$ can be established (see message 346). The collaboration server 252 can continue to listen for requests from various user devices (e.g., associated with users, peers, nodes, etc.) to access the metadata $116_3$ for the purposes described herein (see operation 348).

Further details pertaining to the various process states related to one or more embodiments of the signaling protocol implemented in the herein disclosed techniques are described in FIG. 4A, FIG. 4B, FIG. 4C, and FIG. 4D.

Figure 4A:
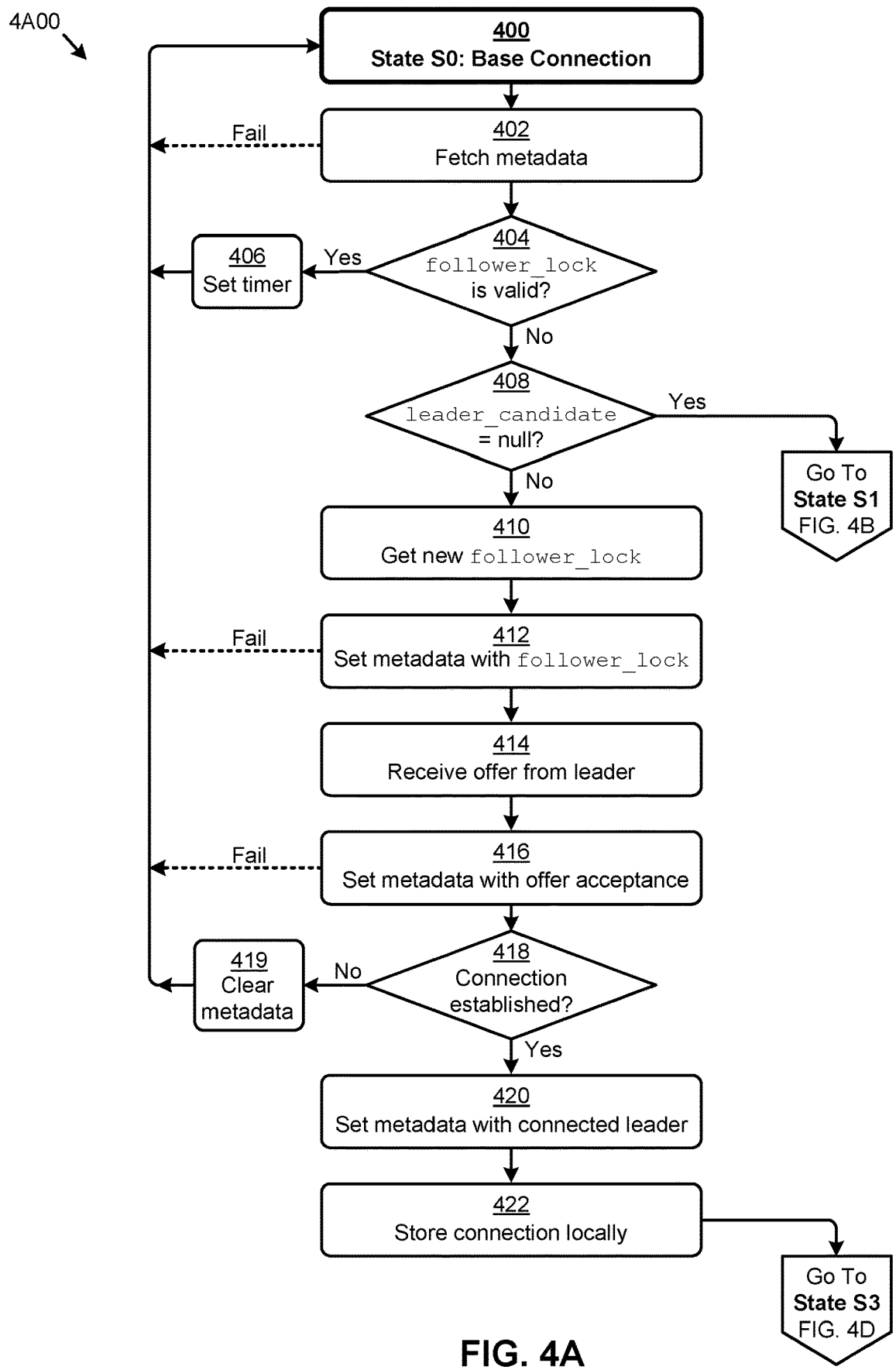
FIG. 4A illustrates a set of connection state operations as implemented in systems for creating peer-to-peer collaborator networks using cloud-based metadata, according to an embodiment.

FIG. 4A illustrates a set of connection state operations 4A00 as implemented in systems for creating peer-to-peer collaborator networks using cloud-based metadata. As an option, one or more variations of connection state operations 4A00 or any aspect thereof may be implemented in the context of the architecture and functionality of the embodiments described herein. The connection state operations 4A00 or any aspect thereof may be implemented in any environment.

The connection state operations 4A00 present one embodiment of certain steps and/or operations associated with a base connection state S0 (see step 400) of a signaling protocol used to implement the herein disclosed techniques. Specifically, for example, state S0 might be one of several states comprising a state machine included in an application operating on a user device to enable one or more collaborators to create peer-to-peer collaborator networks using cloud-based metadata. More specifically, state S0 can represent the initial state for establishing a peer-to-peer connection by a leader peer and/or a follower peer.

As shown, the connection state operations 4A00 can commence with a subject peer (e.g., user) at a machine (e.g., user device) fetching metadata (see step 402). For example, the fetch_metadata routine might be issued from the user device to return metadata to be stored in some previously stored metadata. If this operation fails (see "Fail" path from step 402), the process can return to state S0. In some cases, a wait (e.g., 1 second) can be executed before returning to state S0. If the follower_lock passes a validity test such as "is_valid_follower_lock" (see "Yes" path of decision 404), a timer (e.g., exponential backoff timer) can be set (see step 406) to return to state S0 when the timer has expired. For example, another peer might be attempting to connect to the collaborator network such that the subject peer is not allowed to concurrently connect. If the follower_lock is not set (see "No" path of decision 404), then leader_candidate can be checked (see decision 408). If leader_candidate is null (see "Yes" path of decision 408), the process can continue to state S1 (see FIG. 4B). In this case, the metadata indicates there is no leader, such that the subject peer might become the leader. If leader_candidate is not null (see "No" path of decision 408), a leader for the collaborator network exists. The subject peer can then get a new follower_lock (e.g., new_lock) from the local user device (see step 410) to set the metadata with follower_lock=new_lock (see step 412). In some cases, the follower_lock in the metadata can be set conditional upon follower_lock being set to null. If the metadata set operation fails (see "Fail" path from step 412), the process can return to state S0. In some cases, a wait (e.g., 3 seconds) can be executed before returning to state S0.

The subject peer might then receive an offer to connect from the leader_candidate (see step 414). In response, the subject peer can then get an offer acceptance (e.g., offer_accept) from the local user device to set the metadata with follower_offer=offer_accept (see step 416). In some cases, the follower_offer in the metadata can be set conditional upon follower_offer being set to null. If the metadata set operation fails (see "Fail" path from step 416), the process can return to state S0. In some cases, a wait (e.g., 1 second) can be executed before returning to state S0.

If a peer-to-peer connection between the subject peer machine (e.g., machineID associated with follower_lock) and the leader machine (e.g., machineID associated with leader_candidate) is not established a certain duration (e.g., 5 seconds) following offer acceptance (see "No" path of decision 418), then the process can return to state S0. In some cases, certain portions of the metadata can be cleared prior to returning to state S0 (see step 419). For example leader_candidate, follower_lock, and follower_offer can be set to null conditional on leader_candidate== last_meta. leader_candidate, the conditional test to protect against clearing metadata associated with a leader_candidate different than the leader_candidate associated with the fetched metadata stored in last_meta. In other cases, a wait (e.g., 1 second) can also be executed before returning to state S0.

If a peer-to-peer connection between the subject peer machine and the leader machine is established (see "Yes" path of decision 418), then the last_known_leader attributes in the metadata can be set to the machineID associated with the leader_candidate (see step 420). The various attributes characterizing the connection can then be stored locally on the subject peer machine (see step 422). The process and/or protocol might then continue to state S3 (see FIG. 4D).

Figure 4B:
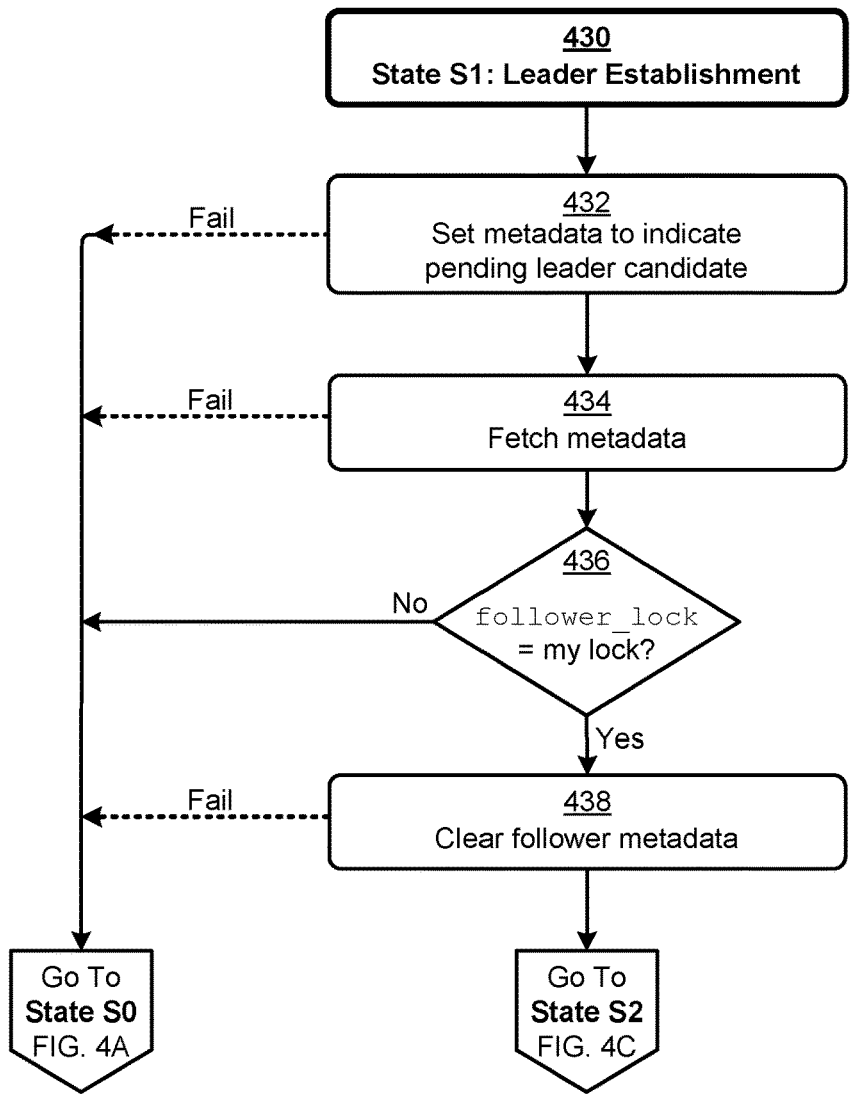
FIG. 4B depicts a set of leader establishment state operations as implemented in systems for creating peer-to-peer collaborator networks using cloud-based metadata, according to an embodiment.

FIG. 4B depicts a set of leader establishment state operations 4B00 as implemented in systems for creating peer-to-peer collaborator networks using cloud-based metadata. As an option, one or more variations of leader establishment state operations 4B00 or any aspect thereof may be implemented in the context of the architecture and functionality of the embodiments described herein. The leader establishment state operations 4B00 or any aspect thereof may be implemented in any environment.

The leader establishment state operations 4B00 present one embodiment of certain steps and/or operations associated with a leader establishment state S1 (see step 430) of a signaling protocol used to implement the herein disclosed techniques. Specifically, for example, state S1 might be one of several states comprising a state machine included in an application operating on a user device to enable one or more collaborators to create peer-to-peer collaborator networks using cloud-based metadata. More specifically, state S1 might be reached when no leader_candidate has been identified (e.g., leader_candidate is null) for a given collaborator network.

As shown, the leader establishment state operations 4B00 can commence with setting the metadata to indicate leader_candidate=pending_candidate conditional upon, in some cases, leader_candidate==last_meta.leader_candidate (see step 432). If this operation fails (see "Fail" path from step 432), the process can return to state S0 (see FIG. 4A). An instance of the metadata can be fetched and returned to be stored in last_meta by, for example, executing the fetch_metadata routine (see step 434). If this operation fails (see "Fail" path from step 434), the process can return to state S0 (see FIG. 4A). If follower_lock does not pass is_my_lock (see "No" path of decision 436), the process can return to state S0 (see FIG. 4A). If follower_lock passes is_my_lock (see "Yes" path of decision 436), the metadata can be set with follower_lock=null and follower_offer=null (see step 438). If the set operation fails (see "Fail" path from step 438), the process can return to state S0 (see FIG. 4A). When the follower_lock and follower_offer attributes have been released (e.g., set to null), a transition to state S2 can occur (see FIG. 4C).

Figure 4C:
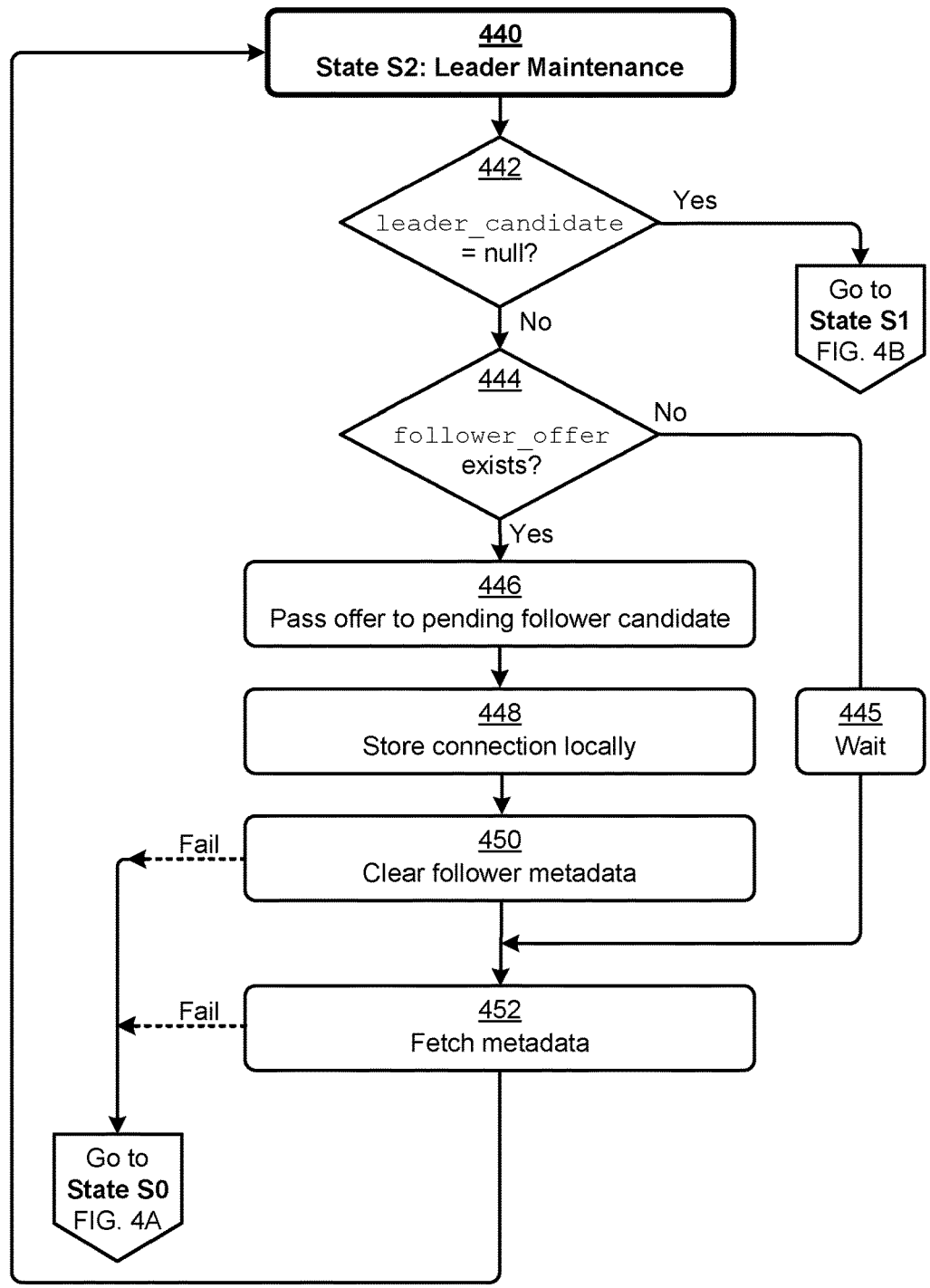
FIG. 4C presents a set of leader maintenance state operations as implemented in systems for creating peer-to-peer collaborator networks using cloud-based metadata, according to an embodiment.

FIG. 4C presents a set of leader maintenance state operations 4C00 as implemented in systems for creating peer-to-peer collaborator networks using cloud-based metadata. As an option, one or more variations of leader maintenance state operations 4C00 or any aspect thereof may be implemented in the context of the architecture and functionality of the embodiments described herein. The leader maintenance state operations 4C00 or any aspect thereof may be implemented in any environment.

The leader maintenance state operations 4C00 present one embodiment of certain steps and/or operations associated with a leader maintenance state S2 (see step 440) of a signaling protocol used to implement the herein disclosed techniques. Specifically, for example, state S2 might be one of several states comprising a state machine included in an application operating on a user device to enable one or more collaborators to create peer-to-peer collaborator networks using cloud-based metadata. More specifically, state S2 might be reached when a leader of a collaboration network has been established to perform certain tasks (e.g., facilitating new connections).

As shown, the leader maintenance state operations 4C00 can commence with checking the most recently fetched instance of the metadata stored at the leader's local machine (e.g., in last_meta) for leader_candidate=null (see decision 442). If leader_candidate=null (e.g., leader is removed due to timeout) (see "Yes" path of decision 442), the process can transition to state S1 (see FIG. 4B). If leader_candidate is not null (see "No" path of decision 442), the follower_offer in last_meta can be checked (see decision 444). If a valid follower_offer does not exist (see "No" path of decision 444), another instance of metadata can be fetched (see step 452) following a certain wait duration (e.g., 2 seconds) (see step 445), and state S2 can be restarted. If the fetch operation fails (see "Fail" path from step 452), the process can return to state S0 (see FIG. 4A).

If a valid follower_offer exists (see "Yes" path of decision 444), the follower_offer can be passed to the pending connection associated with the pending_candidate (see step 446). In some cases, the leader can be facilitating a connection between a follower and the leader. In other cases, the leader can be facilitating a connection between two followers. The leader might then, for example, emit certain attributes associated with the pending connection to a local instance of a connection manager and/or a local instance of a connection data store (see step 448). Certain metadata might then be cleared (see step 450). For example, follower_lock and/or follower_offer might be set to null. If the set operation fails (see "Fail" path from step 450), the process can return to state S0 (see FIG. 4A). An instance of the metadata can then be fetched by, for example, issuing a fetch_metadata command (see step 452). If the fetch operation fails (see "Fail" path from step 452), the process can return to state S0 (see FIG. 4A). If the fetch executes properly, state S2 can then be restarted (e.g., to continue metadata polling).

Figure 4D:
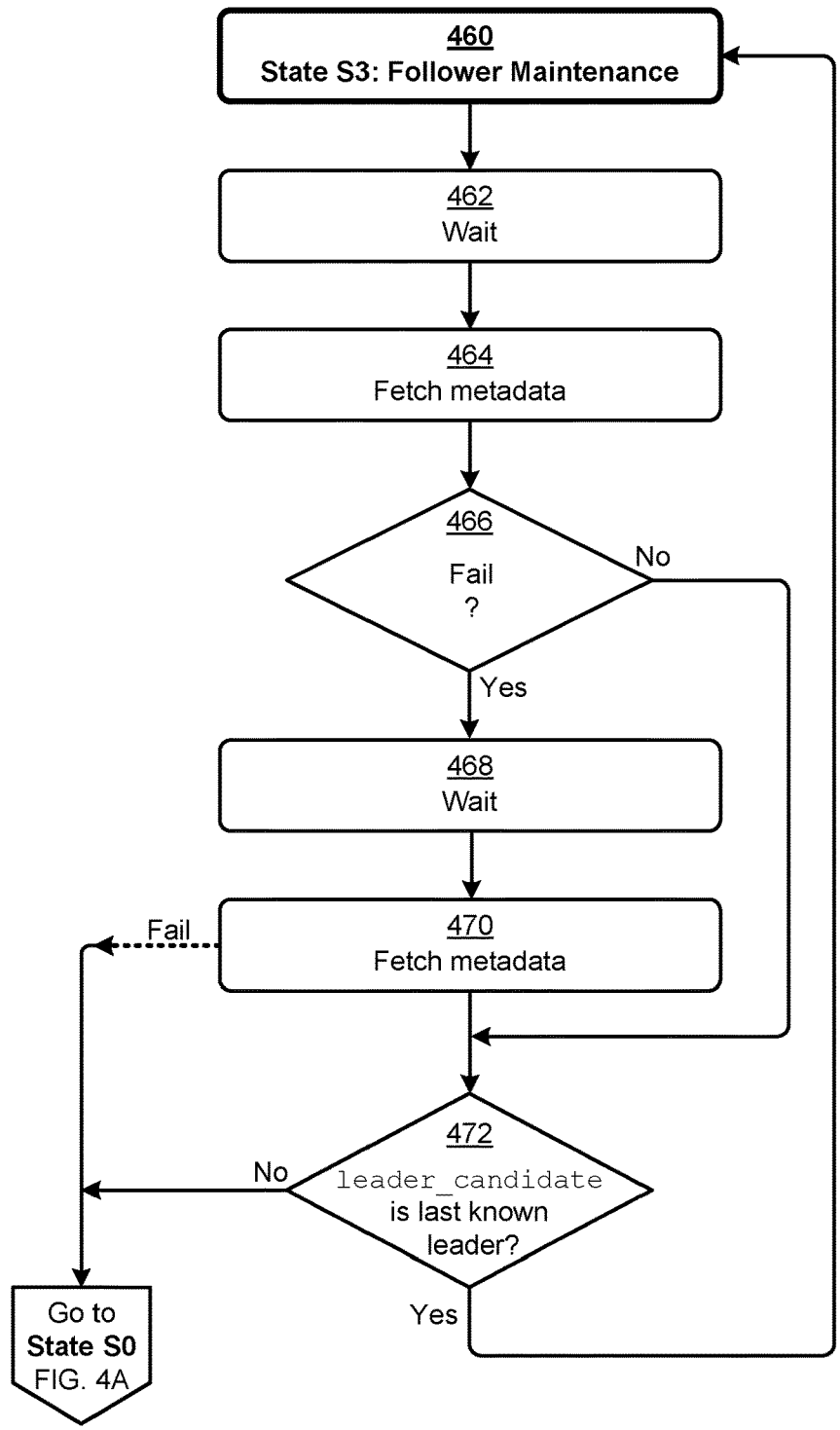
FIG. 4D depicts a set of follower maintenance state operations as implemented in systems for creating peer-to-peer collaborator networks using cloud-based metadata, according to an embodiment.

FIG. 4D depicts a set of follower maintenance state operations 4D00 as implemented in systems for creating peer-to-peer collaborator networks using cloud-based metadata. As an option, one or more variations of follower maintenance state operations 4D00 or any aspect thereof may be implemented in the context of the architecture and functionality of the embodiments described herein. The follower maintenance state operations 4D00 or any aspect thereof may be implemented in any environment.

The follower maintenance state operations 4D00 present one embodiment of certain steps and/or operations associated with a follower maintenance state S3 (see step 460) of a signaling protocol used to implement the herein disclosed techniques. Specifically, for example, state S3 might be one of several states comprising a state machine included in an application operating on a user device to enable one or more collaborators to create peer-to-peer collaborator networks using cloud-based metadata. More specifically, state S3 might be reached when a follower has been connected to a collaboration network and then continues to poll the metadata to maintain the connection.

As shown, the follower maintenance state operations 4D00 can commence with executing a wait (e.g., 5 seconds) (see step 462) before fetching an instance of the metadata to store in last_meta (see step 464). If the fetch operation fails (see "Yes" path of decision 466), another instance of metadata can be fetched (see step 470) following a certain wait duration (e.g., 2 seconds) (see step 468). If the second fetch operation fails (see "Fail" path from step 470), the process can return to state S0 (see FIG. 4A). If the first fetch operation (see step 464) or the second fetch operation (see step 470) is executed without failure, the last_meta can be checked for leader_candidate==last_known_leader (see decision 472). If leader_candidate==last_known_leader (see "Yes" path of decision 472) then state S3 can be restarted.

If leader_candidate is not the last_known_leader (see "No" path of decision 472) then the process can return to state S0 (see FIG. 4A).

The foregoing states, operations, and/or protocols describe many aspects of a signaling phase associated with establishing certain connections using the herein disclosed techniques. Specifically, for example, one peer might use various signaling techniques to enter a "leader" state in a collaborator network (e.g., as the first to invoke the creation of the network) to facilitate other "follower" peers to connect to the just-established collaborator network. The followers can use other signaling techniques (e.g., quasi-locks to avoid conflicts) to accept connection attributes from the leader. Each connection between peers can represent a single edge between two nodes, with the machines (e.g., user devices) associated with each peer representing the nodes. According to the herein disclosed techniques, after a follower node connects to the leader node, a node-to-node communication protocol can connect the follower node to all other connected follower nodes in the ad hoc collaborator network. Such a protocol is described as pertains to FIG. 5.

FIG. 5 presents a node-to-node communication protocol 500 as implemented in systems for creating peer-to-peer collaborator networks using cloud-based metadata. As an option, one or more variations of node-to-node communication protocol 500 or any aspect thereof may be implemented in the context of the architecture and functionality of the embodiments described herein. The node-to-node communication protocol 500 or any aspect thereof may be implemented in any environment.

The node-to-node communication protocol 500 comprises a set of high order interactions (e.g., operations, messages, etc.) among representative peers in a peer-to-peer collaborator network created using cloud-based metadata according to the herein disclosed techniques. Specifically, the representative peers are each depicted by a user device $202_{L1}$, a user device $202_{F1}$, and a user device $202_{FN}$ associated with a leader, a first follower, and a second follower, respectively. The user devices each comprise a connection interface (e.g., connection interface $208_{L1}$, connection interface $208_{F1}$, and connection interface $208_{FN}$) and a set of local connection data (e.g., connection data $210_{L1}$, connection data $210_{F1}$, and connection data $210_{FN}$). The connection data can further comprise sets of data characterizing pending connections (e.g., pending connections $512_{L1}$, pending connections $512_{F1}$, and pending connections $512_{FN}$) and sets of data characterizing connected nodes (e.g., connected nodes $514_{L1}$, connected nodes $514_{F1}$, and connected nodes $514_{FN}$). For example, the pending connections can comprise a map of machineIDs to pending incoming connections. Also, for example, the connection nodes can comprise a map of machineIDs to connections associated with each respective machineID.

In one or more embodiments, certain events and/or commands can be established to support the node-to-node communication protocol 500. Such events and/or commands might be characterized by attributes describing a type, a payload, a sender, and/or a recipient. The sender and/or the recipient might be represented by a machineID. For example, a hello command might have a payload containing a machineID of the sender. A peers? command might be a query (e.g., with no payload) issued to another node requesting a list of peers associated with the target node. A peers response (e.g., to the peers? query) might provide an array of machineIDs associated with connected peers. A connect? command might have a payload describing a connection offer. As another example, a transport command might comprise a payload having a set of arbitrary content (e.g., for general node-to-node communication). Note that the foregoing peers? commands are issued to a peer node—there is no centralized storage of a table of all of the peers in the ad-hoc collaborator network.

The foregoing events, commands, and/or other capabilities can be used by the user devices in the node-to-node communication protocol 500 as shown in FIG. 5. Specifically, user device $202_{F1}$ and user device $202_{FN}$ (e.g., the followers) might have each established a connection with user device $202_{L1}$ (e.g., the leader) using the herein disclosed techniques (see message $522_1$ and message $522_N$, respectively). In some cases, when a connection is established, a hello command can be issued from the leader to the connected follower (see message 524). The machineID in the payload of the hello command can be removed from the pending connections (e.g. pending connections $512_{F1}$) to indicate that the previously pending connection has been established (see operation 526). Further, the machineID in the payload of the hello command can be added (see operation 528) by the user device $202_{F1}$ to the connected nodes $514_{F1}$.

The user device $202_{F1}$ might then want to discover other peers connected to the leader user device by issuing a peers? command to user device $202_{L1}$ (see message 530). The leader can respond by returning a peers command comprising an array of the machineIDs connected to the leader in the collaborator network (see message 532). For example, in the case shown, the peers array can include the user device $202_{FN}$. As further shown, for each machineID in the peers array, certain messages and/or operations can be performed as invoked by user device $202_{F1}$ (see grouping 560). Specifically, if the selected machineID is already in connected nodes $514_{F1}$ or pending connections $512_{F1}$, then the next machineID can be selected (see operation 534). If the selected machineID (e.g., for user device $202_{FN}$) is not associated with an existing or pending connection, a connect? offer can be sent to the leader (see message 536) for forwarding to the targeted machineID (see message 540). For example, if the machine receiving the connect? request (e.g., user device $202_{L1}$) is not the intended recipient (e.g., user device $202_{FN}$), and the intended recipient is included in connected nodes (e.g., connected nodes $514_{L1}$), then the connect? request can be forwarded. If the machine receiving the connect? request is not the intended recipient and the intended recipient is not included in the connected nodes, then the request can be ignored. The machine issuing the connect? offer can also generate attributes (e.g., the "to" machineID, the local_offer attribute, etc.) characterizing a pending connection to be stored in pending connections $512_{F1}$ (see operation 538).

The machine (e.g., user device $202_{FN}$) receiving the offer can accept the offer (see operation 542). In some cases, the machineID of the sender of the offer might exist in connected nodes $514_{FN}$ such that the offer can be ignored. If the offer is accepted, the user device $202_{FN}$ might further generate attributes (e.g., the "from" machineID, the local_offer attribute, etc.) characterizing a pending connection to be stored in a local instance of pending connections $512_{FN}$ (see operation 546). A connect command having, for example, the local_offer attribute in the payload can then be sent to the leader (see message 544) to be forwarded to the connection requester (see message 548). In this case, the received connect command can be verified (e.g., machineID is in pending connections $512_{F1}$) and applied to the associated connection in pending connections $512_{F1}$ (see operation 550). In other cases, if the connect response is not received before a certain time duration (e.g., 10 seconds) following the issuance of the connect? offer, the pending connection is removed.

When the nodes in a given collaborator network have connected in a complete graph, messages can be exchanged among the peers using the transport command. For example, and as shown, user device $202_{F1}$ might send a transport command to all connected peers. Specifically, the leader might receive the transport command directly from the follower issuing the command (see message $552_1$), while other followers might receive the transport command as forwarded by the leader (see message $552_N$). Other operations not shown in the node-to-node communication protocol 500 are possible. For example, a connection can be removed by removing the machineID(s) association with the connection from the pending connections data and/or the connected nodes data in the connection data.

Figure 6A:
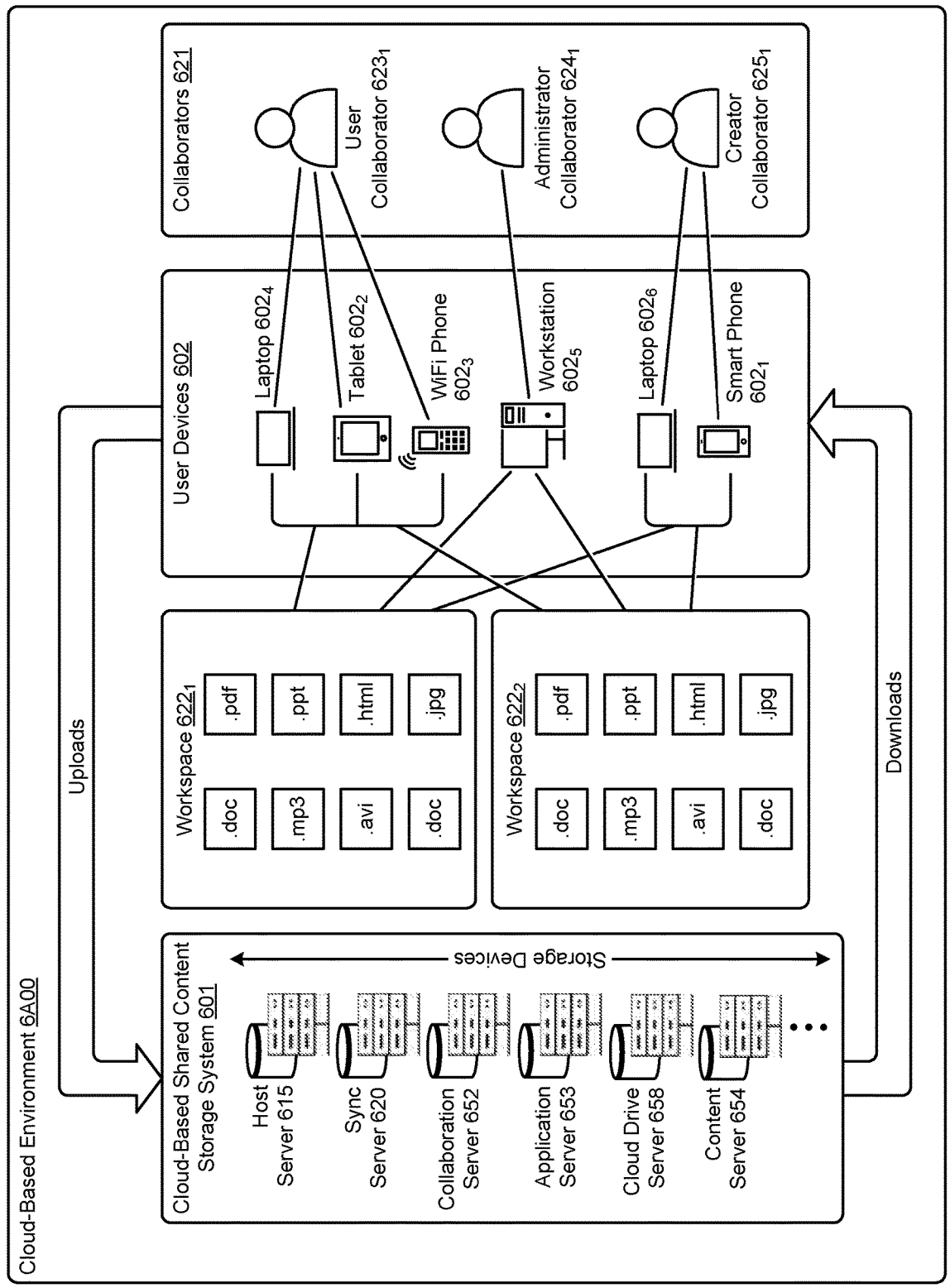
FIG. 6A presents a cloud-based environment including a collaborative cloud-based shared content management platform that facilitates creating peer-to-peer collaborator networks using cloud-based metadata, according to some embodiments.

FIG. 6A presents a cloud-based environment 6A00 including a collaborative cloud-based shared content management platform that facilitates creating peer-to-peer collaborator networks using cloud-based metadata. As an option, one or more variations of cloud-based environment 6A00 or any aspect thereof may be implemented in the context of the architecture and functionality of the embodiments described herein. The cloud-based environment 6A00 or any aspect thereof may be implemented in any environment.

As shown, certain users (e.g., collaborators 621) having various collaboration roles (e.g., user collaborator $623_1$, administrator collaborator $624_1$, creator collaborator $625_1$, etc.) can use one or more instances of user devices 602 to interact with one or more workspaces (e.g., workspace $622_1$, workspace $622_2$, etc.) within the cloud-based environment 6A00. The workspaces can be stored in any location, and are at least partially maintained by components within a cloud-based shared content storage system 601. The cloud-based shared content storage system 601 supports any variety of processing elements and/or storage devices (e.g., a storage filer, a storage facility, etc.) and/or servers such as a host server 615, a sync server 620, a collaboration server 652, an application server 653, a cloud drive server 658, a content server 654, etc.

Any of the users can access shared content from the cloud-based shared content storage system 601 without the additional process of manually downloading and storing a file locally on an instance of the user devices 602 (e.g., smart phone $602_1$, tablet $602_2$, WiFi phone $602_3$, laptop $602_4$, workstation $602_5$, laptop $602_6$, etc.). For example, a content object (e.g., computer file, text document, audio file, video file, image file, etc.) created by the creator collaborator $625_1$ might be viewed by the user collaborator $623_1$ without informing the user collaborator $623_1$ where the file is stored or without prompting the user collaborator $623_1$ for a directory from which to access the file. Such a facility streamlines the frequently repeated sharing and collaboration processes.

Functions and techniques performed by the cloud-based shared content storage system 601 and/or the client side components (e.g., user devices 602, a collaboration client on an instance of the user devices 602, etc.) are described herein with further details and with reference to several examples. Specifically, the collaborators 621 might use an instance of a web application on a respective one of the user devices 602 to create ad hoc peer-to-peer connection networks using metadata stored on the cloud-based shared content storage system 601 for signaling. Further details pertaining to implementing the herein disclosed techniques in the cloud-based environment 6A00 are described in FIG. 6B.

Figure 6B:
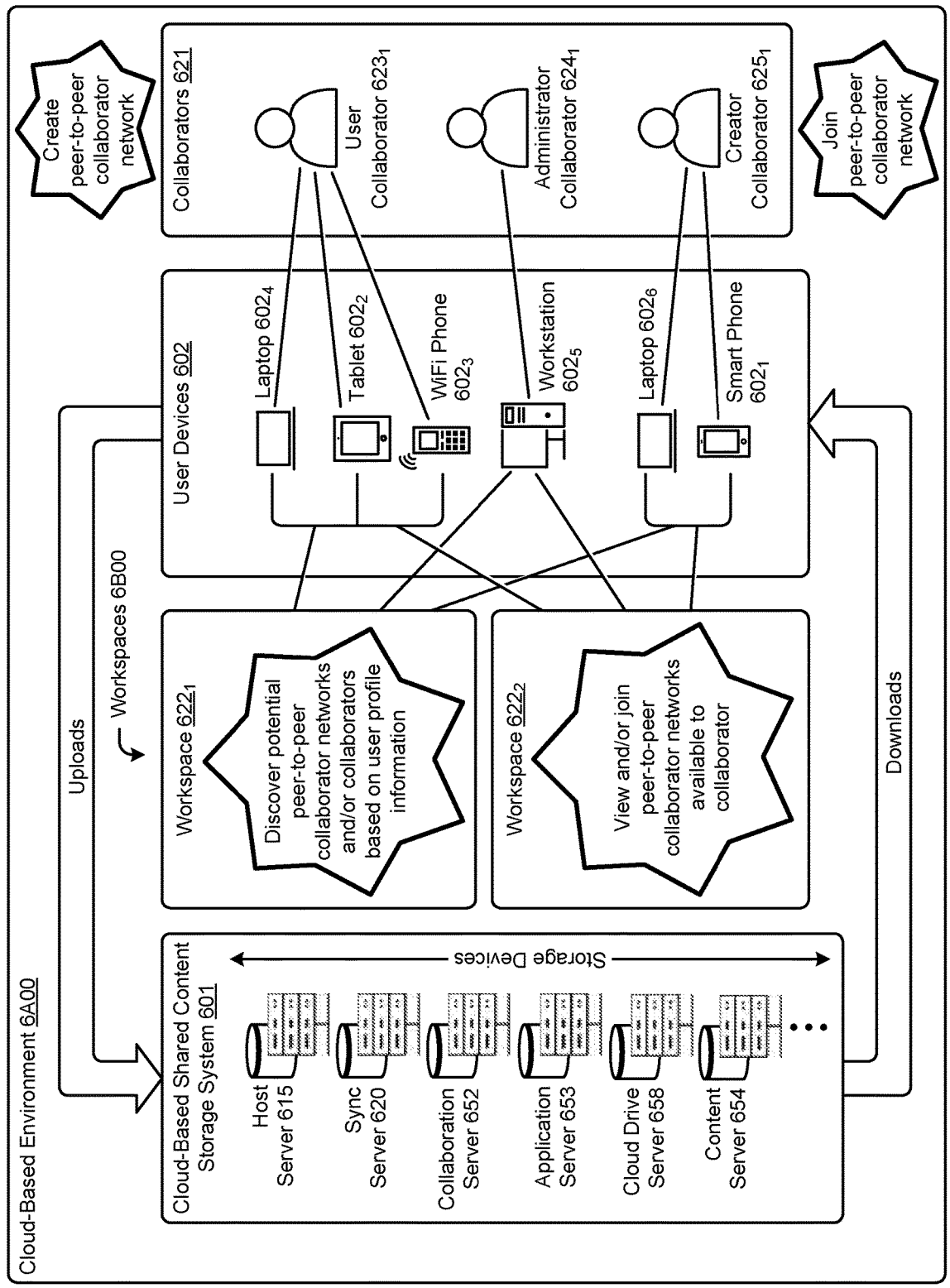
FIG. 6B presents a schematic view of workspaces populated with dynamically-created content using peer-to-peer collaborator networks created using cloud-based metadata, according to an embodiment.

FIG. 6B presents a schematic view of workspaces 6B00 populated with dynamically-created content using peer-to-peer collaborator networks created using cloud-based metadata. As an option, one or more variations of workspaces 6B00 or any aspect thereof may be implemented in the context of the architecture and functionality of the embodiments described herein. The workspaces 6B00 or any aspect thereof may be implemented in any environment.

The embodiment shown in FIG. 6B is merely one example implementation of herein disclosed techniques in the cloud-based environment 6A00 where two or more of the collaborators 621 (e.g., the user collaborator $623_1$, the administrator collaborator $624_1$, and the creator collaborator $625_1$) create and/or join peer-to-peer collaborator networks created using cloud-based metadata. In some cases, the collaborators 621 might view certain attributes (e.g., collaborator network members, potential network members, member roles, etc.) of the collaborator networks in a respective collaborator-specific workspace (e.g., workspace $622_1$, workspace $622_2$, etc.). In other cases, the collaborator network is formed to share a content object (e.g., computer file, electronic document, image, etc.) and/or a collection (e.g., folder) of content objects, where each collaborator might have certain access capabilities (e.g., for viewing, editing, downloading, etc.) pertaining to the shared content object in a respective collaborator-specific workspace (e.g., workspace $622_1$, workspace $622_2$, etc.).

The embodiment shown in FIG. 6B indicates certain operations associated with techniques for creating peer-to-peer collaborator networks created using cloud-based metadata. Specifically, a capability to efficiently discover potential peer-to-peer collaborator networks and/or potential collaborators based on user profile information is shown within workspace $622_1$. For example, the creator collaborator $625_1$ might be able to view in the workspace $622_1$ certain content objects (e.g., content the creator collaborator $625_1$ owns and/or otherwise controls) that can be determined to have an associated peer-to-peer collaborator network based on certain user profile information stored in the storage devices of the cloud-based shared content storage system 601. The creator collaborator $625_1$ might then invoke the creation of a collaborator network based on such content using the herein disclosed techniques by, in part, accessing metadata stored in the storage devices of the cloud-based shared content storage system 601 through an API operated, for example, on the collaboration server 652. Also, a capability to view and/or join peer-to-peer collaborator networks available to a given user is shown in workspace $622_2$. For example, the user collaborator $623_1$ (e.g., the follower) might use the metadata in the cloud-based shared content storage system 601 in a signaling protocol with the creator collaborator $625_1$ (e.g., the leader) to join the foregoing peer-to-peer collaborator network created by the creator collaborator $625_1$.

Additional Embodiments of the Disclosure

Additional Practical Application Examples

Figure 7A:
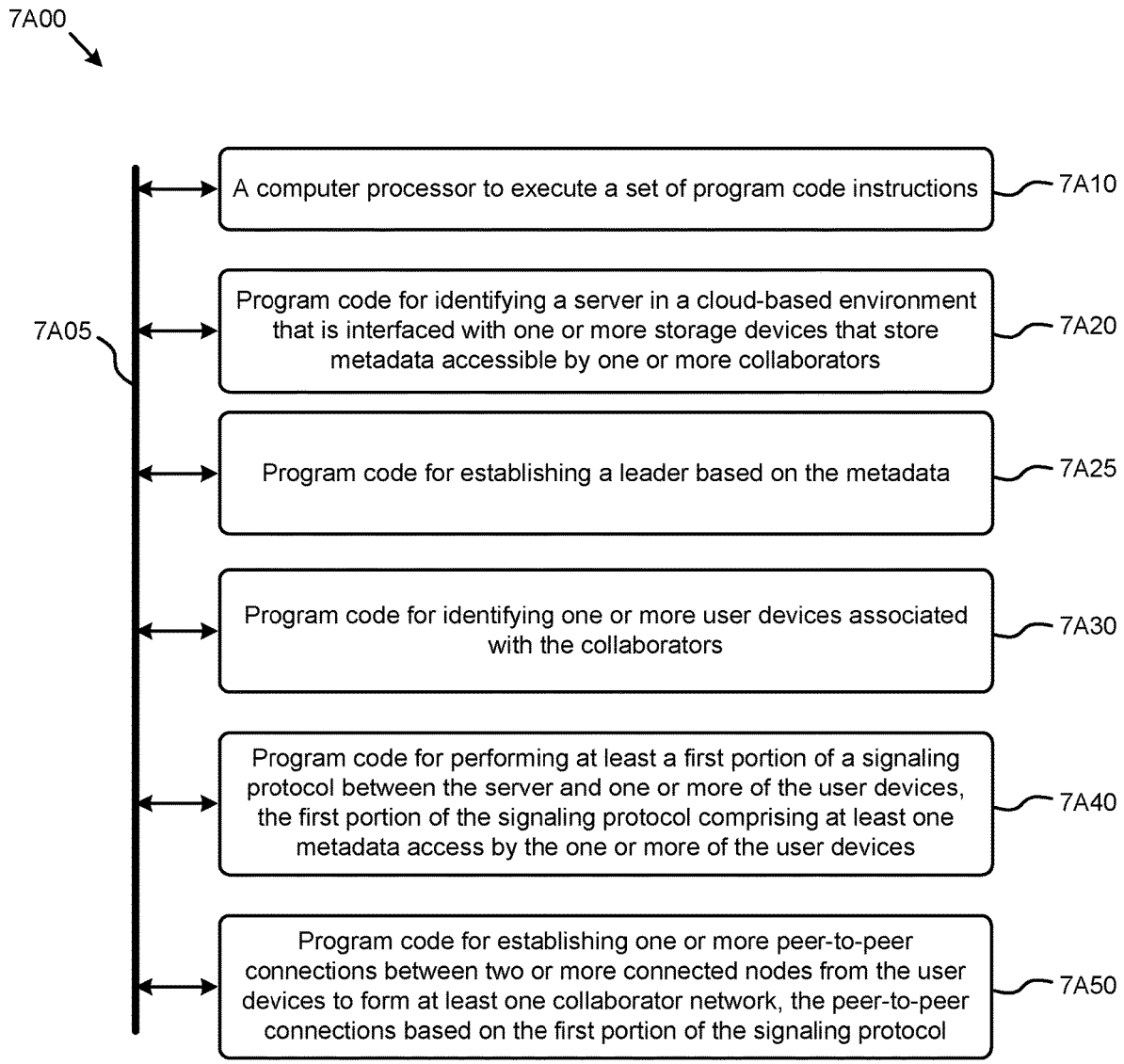
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: identifying a server in a cloud-based environment that is interfaced with one or more storage devices that store metadata accessible by one or more collaborators (see module 7A20); establishing a leader (e.g., where a leader is the first device among a set of peer-to-peer connections) based on the metadata (see module 7A25); identifying one or more user devices associated with the collaborators (see module 7A30); performing at least a first portion of a signaling protocol between the server and one or more of the user devices, the first portion of the signaling protocol comprising at least one metadata access by the one or more of the user devices (see module 7A40); and establishing one or more peer-to-peer connections between two or more connected nodes from the user devices to form at least one collaborator network, the peer-to-peer connections based on the first portion of the signaling protocol (see module 7A50).

The embodiment of the foregoing implementations admit of many variations and extensions. Strictly as examples, the embodiments can include variations:
  where the metadata access comprises at least one of, a compare and swap operation, or a read operation, or a modification operation, or any combinations thereof;
  where the metadata access is authenticated based at least in part on one or more user attributes;
  where the metadata access is facilitated by a metadata API;
  where the metadata comprises at least one of, one or more atomic variables, or one or more key-value pairs, or any combination thereof;
  where at least one server connection used to perform the signaling protocol is an ephemeral connection;
  where the peer-to-peer connections are WebRTC connections;
  where at least one of the peer-to-peer connections is established based at least in part on performing a portion of a node-to-node communication protocol, the portion of the node-to-node communication protocol performed to result in a change of connection data pertaining to the connected nodes;
  further comprising determining a leader from the one or more of the user devices based at least in part on a second portion of the signaling protocol, the second portion of the signaling protocol comprising at least one metadata access by the one or more of the user devices;
  further comprising determining one or more followers from the one or more of the user devices based at least in part on a third portion of the signaling protocol, the third portion of the signaling protocol comprising at least one metadata access by the one or more of the user devices;
  further comprising delivering an application to the user devices to facilitate establishing the one or more peer-to-peer connections;
  where a message from a first connected node is transported by a second connected node to one or more connected nodes in the collaborator network; and
  variations where the second connected node is a leader of the collaborator network.

Figure 7B:
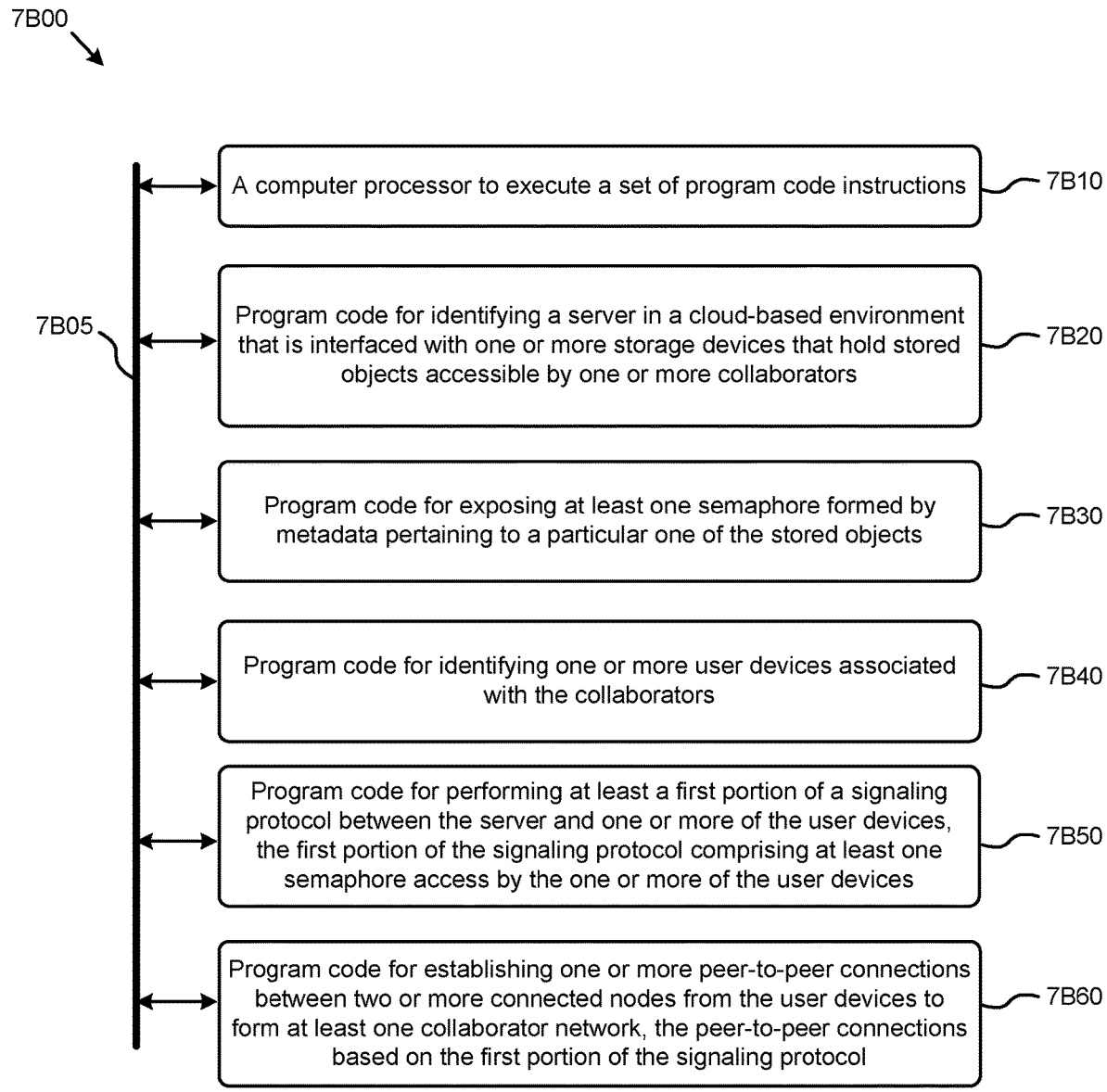

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising a computer processor to execute a set of program code instructions (see module 7B10) and modules for accessing memory to hold program code instructions to perform: identifying a server in a cloud-based environment that is interfaced with one or more storage devices that hold stored objects accessible by one or more collaborators (see module 7B20); exposing at least one semaphore formed by metadata pertaining to a particular one of the stored objects (see module 7B30); identifying one or more user devices associated with the collaborators (see module 7B40); performing at least a first portion of a signaling protocol between the server and one or more of the user devices, the first portion of the signaling protocol comprising processing at least one semaphore access request by the one or more of the user devices (see module 7B50); and establishing one or more peer-to-peer connections between two or more connected nodes from the user devices to form at least one collaborator network, the peer-to-peer connections based on the first portion of the signaling protocol (see module 7B60).

System Architecture Overview

Additional System Architecture Examples

Figure 8A:
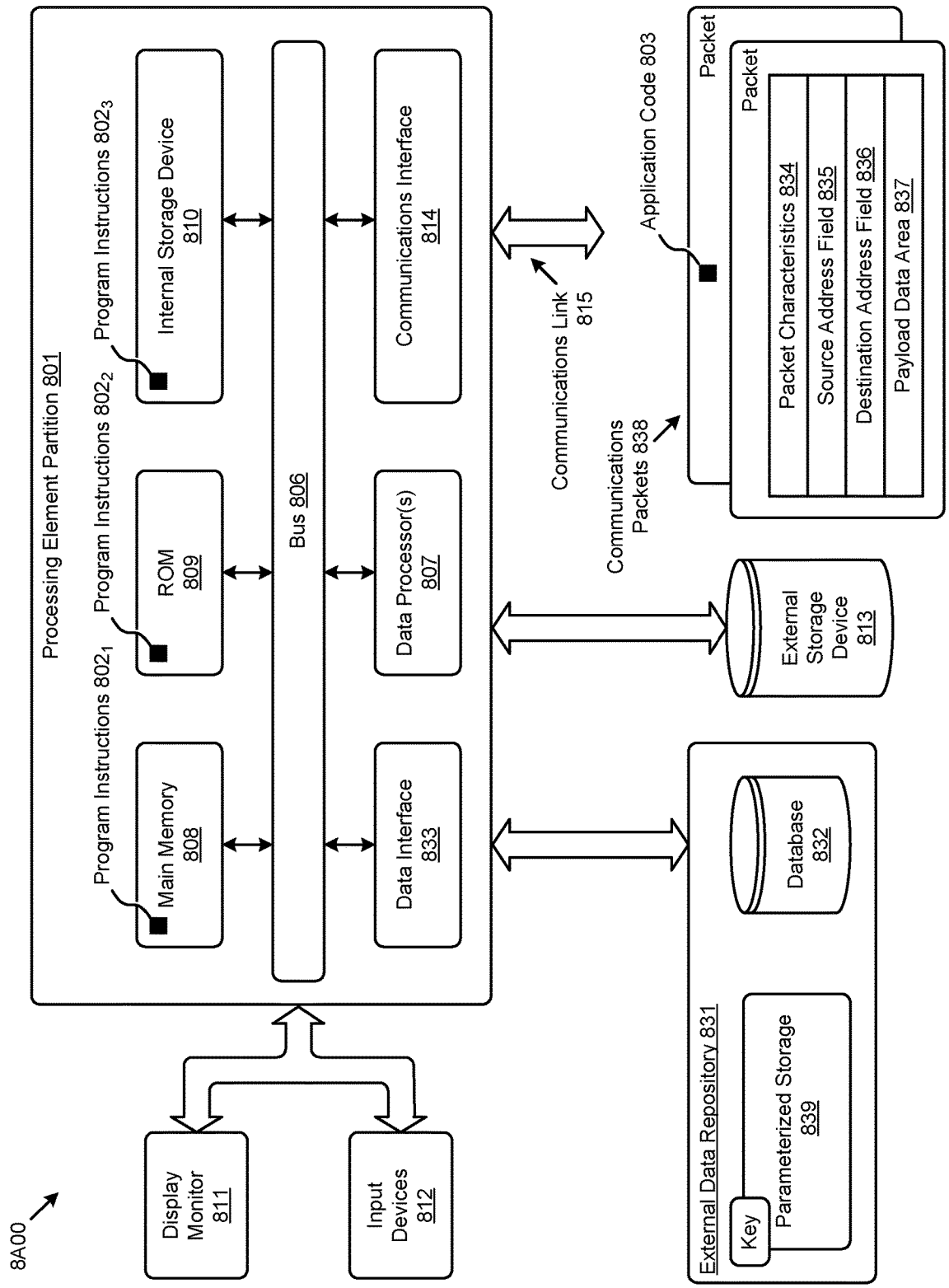
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device (or in or upon any other non-volatile storage) for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of creating peer-to-peer collaborator networks using cloud-based metadata.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of creating peer-to-peer collaborator networks using cloud-based metadata). Such files or records can be brought into and/or stored in volatile or non-volatile memory.

Figure 8B:
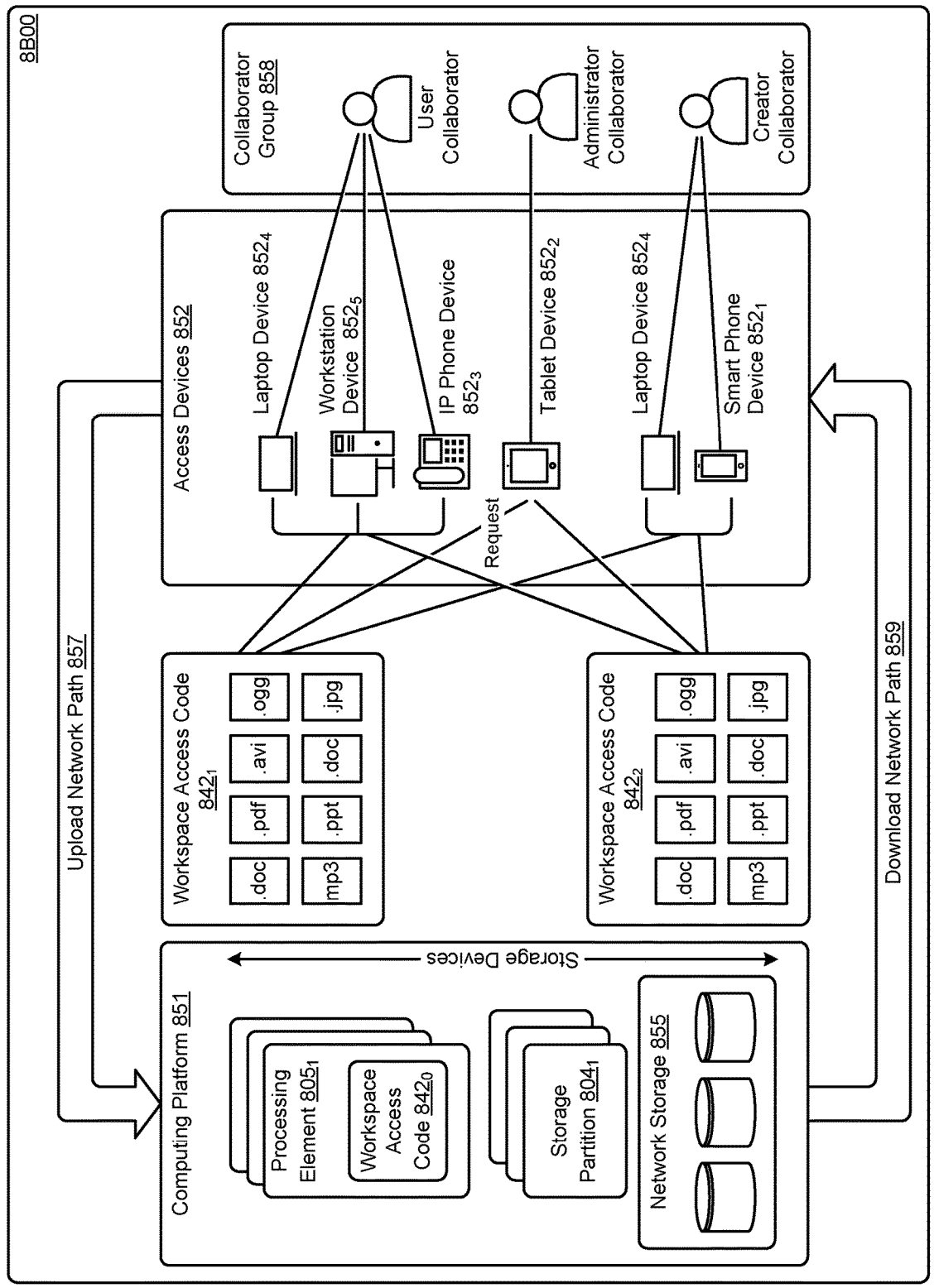

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$) Workspace access code can be executed on any of the shown access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. A portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such the shown networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
identifying a server in a cloud-based environment that is interfaced with one or more storage devices that hold stored objects accessible by one or more collaborators;
creating a peer-to-peer connection by using a signaling protocol that operates by signaling among nodes in the peer-to-peer connection using cloud-based metadata that comprises an atomic variable, by:
exposing at least one signaling value corresponding to the atomic variable formed by the cloud-based metadata pertaining to a particular one of the stored objects, the at least one signaling value to coordinate access to the cloud-based metadata to create the peer-to-peer connection;
identifying one or more user devices associated with the one or more collaborators;
performing at least a portion of a signaling protocol between the server and one or more of the user devices, the portion of the signaling protocol comprising processing at least one access request using the at least one signaling value by the one or more of the user device, wherein the signaling protocol comprises access of the cloud-based metadata to configure an attribute that correlates to establishment of a leader or a follower for the peer-to-peer connection; and
establishing the peer-to-peer connection between two or more of the user devices to form at least one collaborator network.

2. The method of claim 1, wherein the at least one signaling value is an atomic key-value pair.

3. The method of claim 1, wherein the access request comprises at least one of, a compare and swap operation, or a read operation, or a modification operation, or any combination thereof.

4. The method of claim 3, further comprising authenticating metadata access based at least in part on one or more user attributes.

5. The method of claim 4, wherein the metadata access is facilitated by a metadata API.

6. The method of claim 1, wherein the metadata comprises at least one of, one or more atomic variables, or one or more key-value pairs, or any combination thereof.

7. The method of claim 1, wherein at least one server connection is used to perform the signaling protocol that is not a persistent connection.

8. The method of claim 1, wherein the peer-to-peer connections are WebRTC connections.

9. The method of claim 1, wherein at least one of the peer-to-peer connections is established based at least in part on performing a portion of a node-to-node communication protocol, the portion of the node-to-node communication protocol performed to result in a change of connection data pertaining to connected nodes.

10. The method of claim 1, wherein determining a leader from the one or more of the user devices is based at least in part on at least one metadata access by the one or more of the user devices.

11. The method of claim 1, wherein determining one or more followers from the one or more of the user devices is based at least in part on an additional portion of the signaling protocol, the additional portion of the signaling protocol comprising at least one metadata access by the one or more of the user devices.

12. A computer readable medium, embodied in a non-transitory computer readable medium, the non-transitory computer readable medium having stored thereon a sequence of instructions which, when stored in memory and executed by a processor causes the processor to perform a set of acts, the acts comprising:

identifying a server in a cloud-based environment that is interfaced with one or more storage devices that hold stored objects accessible by one or more collaborators;

creating a peer-to-peer connection by using a signaling protocol that operates by signaling among nodes in the peer-to-peer connection using cloud-based metadata that comprises an atomic variable, by:

exposing at least one signaling value corresponding to the atomic variable formed by the cloud-based metadata pertaining to a particular one of the stored objects, the at least one signaling value to coordinate access to the cloud-based metadata to create the peer-to-peer connection;

identifying one or more user devices associated with the one or more collaborators;

performing at least a portion of a signaling protocol between the server and one or more of the user devices, the portion of the signaling protocol comprising processing at least one access request using the at least one signaling value by the one or more of the user devices, wherein the signaling protocol comprises access of the cloud-based metadata to configure an attribute that correlates to establishment of a leader or a follower for the peer-to-peer connection; and establishing the peer-to-peer connection between two or more of the user devices to form at least one collaborator network.

13. The computer readable medium of claim 12, wherein the at least one signaling value is an atomic key-value pair.

14. The computer readable medium of claim 12, wherein the access request comprises at least one of, a compare and swap operation, or a read operation, or a modification operation, or any combination thereof.

15. The computer readable medium of claim 14, further comprising authenticating metadata access based at least in part on one or more user attributes.

16. The computer readable medium of claim 15, wherein the metadata access is facilitated by a metadata API.

17. The computer readable medium of claim 12, wherein the metadata comprises at least one of, one or more atomic variables, or one or more key-value pairs, or any combination thereof.

18. The computer readable medium of claim 12, wherein at least one server connection is used to perform the signaling protocol that is not a persistent connection.

19. A system comprising:

a storage medium having stored thereon a sequence of instructions; and a processor or processors that execute the instructions to cause the processor or processors to perform a set of acts, the acts comprising, identifying a server in a cloud-based environment that is interfaced with one or more storage devices that hold stored objects accessible by one or more collaborators;

creating a peer-to-peer connection by using a signaling protocol that operates by signaling among nodes in the peer-to-peer connection using cloud-based metadata that comprises an atomic variable, by:

exposing at least one signaling value corresponding to the atomic variable formed by metadata pertaining to a particular one of the stored objects, the at least one signaling value to coordinate access to the metadata to create the peer-to-peer connection;

identifying one or more user devices associated with the collaborators;

performing at least a portion of a signaling protocol between the server and one or more of the user devices, the portion of the signaling protocol comprising processing at least one access request using the at least one signaling value by the one or more of the user device, wherein the signaling protocol comprises access of the cloud-based metadata to configure an attribute that correlates to establishment of a leader or a follower for the peer-to-peer connection; and establishing the peer-to-peer connection between two or more of the user devices to form at least one collaborator network.

20. The system of claim 19, wherein the at least one signaling value is an atomic key-value pair.

21. The system of claim 19, wherein the access request comprises at least one of, a compare and swap operation, or a read operation, or a modification operation, or any combination thereof.

* * * * *